(12) United States Patent
Derr et al.

(10) Patent No.: US 11,251,889 B2
(45) Date of Patent: Feb. 15, 2022

(54) WIRELESS SIGNAL MONITORING AND ANALYSIS, AND RELATED METHODS, SYSTEMS, AND DEVICES

(71) Applicants: Battelle Energy Alliance, LLC, Idaho Falls, ID (US); University of Utah Research Foundation, Salt Lake City, UT (US)

(72) Inventors: Kurt W. Derr, Idaho Falls, ID (US); Samuel Ramirez, Shelley, ID (US); Sneha K. Kasera, Salt Lake City, UT (US); Christopher D. Becker, Aitkin, MN (US); Aniqua Z. Baset, Salt Lake City, UT (US)

(73) Assignees: Battelle Energy Alliance, LLC, Idaho Falls, ID (US); University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 16/569,565

(22) Filed: Sep. 12, 2019

(65) Prior Publication Data

US 2020/0007249 A1    Jan. 2, 2020

Related U.S. Application Data

(63) Continuation-in-part of application No. PCT/US2019/032845, filed on May 17, 2019, and a
(Continued)

(51) Int. Cl.
  *H04B 17/345* (2015.01)
  *H04B 17/391* (2015.01)
  *G06N 20/10* (2019.01)

(52) U.S. Cl.
  CPC ......... *H04B 17/345* (2015.01); *H04B 17/391* (2015.01); *G06N 20/10* (2019.01)

(58) Field of Classification Search
  CPC ...... G06N 3/088; G06N 20/00; G06N 3/0545; G06N 20/10; H04B 17/391–3913; H04B 2201/692
  See application file for complete search history.

(56) References Cited

U.S. PATENT DOCUMENTS

| 6,175,634 B1 | 1/2001 | Graumann |
| 7,680,502 B2 | 3/2010 | McCown et al. |

(Continued)

FOREIGN PATENT DOCUMENTS

WO    2018/170267 A1    6/2018

OTHER PUBLICATIONS

Yadav et al., "Hybrid Cooperative Spectrum Sensing with Cyclostationary Detection for Cognitive Radio Networks", 2016, IEEE, (Year: 2016).*

(Continued)

*Primary Examiner* — Raymond S Dean
(74) *Attorney, Agent, or Firm* — TraskBritt

(57) ABSTRACT

Wireless signal classifiers and systems that incorporate the same may include an energy-based detector configured to analyze an entire set of measurements and generate a first signal classification result, a cyclostationary-based detector configured to analyze less than the entire set of measurements and generate a second signal classification result; and a classification merger configured to merge the first signal classification result and the second signal classification result. Ensemble wireless signal classification and systems and devices the incorporate the same are disclosed. Some ensemble wireless signal classification may include energy-based classification processes and machine learning-based classification processes. In some embodiments, incremental machine learning techniques may be incorporated to add
(Continued)

new machine learning-based classifiers to a system or update existing machine learning-based classifiers.

8 Claims, 18 Drawing Sheets

Related U.S. Application Data continuation-in-part of application No. PCT/US2018/022639, filed on Mar. 15, 2018.

(60) Provisional application No. 62/800,251, filed on Feb. 1, 2019, provisional application No. 62/673,545, filed on May 18, 2018, provisional application No. 62/472,387, filed on Mar. 16, 2017.

(56) References Cited

U.S. PATENT DOCUMENTS

| | | | |
|---|---|---|---|
| 8,494,464 B1 | 7/2013 | Kadambe et al. | |
| 8,938,202 B1* | 1/2015 | Thommana | H04W 52/0229 455/74 |
| 8,958,764 B1* | 2/2015 | Xu | H04L 27/22 455/196.1 |
| 9,195,934 B1 | 11/2015 | Hunt et al. | |
| 10,372,587 B1* | 8/2019 | Sternberg | G06F 21/755 |
| 2009/0047920 A1* | 2/2009 | Livsics | H04W 24/04 455/226.1 |
| 2009/0154291 A1 | 6/2009 | Ferber | |
| 2010/0266002 A1* | 10/2010 | Du | H04B 17/345 375/224 |
| 2012/0263247 A1 | 10/2012 | Bhattad et al. | |
| 2013/0288734 A1 | 10/2013 | Mody et al. | |
| 2013/0297299 A1 | 11/2013 | Chakrabartty et al. | |
| 2013/0336425 A1* | 12/2013 | Lee | H04L 27/0006 375/303 |
| 2014/0106801 A1* | 4/2014 | Tamizhmani | H04L 1/0003 455/501 |
| 2015/0071129 A1* | 3/2015 | Soderlund | H04W 8/18 370/259 |
| 2015/0087347 A1* | 3/2015 | Roberts | H04W 16/14 455/509 |
| 2017/0014794 A1 | 1/2017 | Seul | |
| 2017/0147940 A1 | 5/2017 | Mitola, III | |

OTHER PUBLICATIONS

Hong et al., "DOF: A Local Wireless Information Plane", ACM SIGCOMM Computer Communication Review—SIGCOMM '11, vol. 41 Issue 4, (Aug. 2011) pp. 230-241.

International Patent Application Serial No. PCT/US2019/032845, filed May 17, 2019, titled "Spectrum Monitoring and Analysis, and Related Methods, Systems, and Devices", to Derr et al., 50 pages.

International Search Report from International Application No. PCT/US2018/022639, dated Jul. 2, 2018, 4 pages.

International Written Opinion from International Application No. PCT/US2018/022639, dated Jul. 2, 2018, 5 pages.

Lakshminarayanan et al., "RFDump: An Architecture for Monitoring the Wireless Ether", Proceedings of the 5th international conference on Emerging networking experiments and technologies, Rome, Italy (Dec. 2009) pp. 253-264.

Li, "Mixed Signal Detection and Parameter Estimation based on Second-Order Cyclostationary Features", A thesis submitted in partial fulfillment of the requirements for the degree of Masters of Science in Engineering, Wright State University (Dec. 2019) 49 pages.

International Search Report and Written Opinion received for PCT Patent Application No. PCT/US18/022639, dated Jul. 2, 2018, 9 pages.

Li, D. "Mixed Signal Detection and Parameter Estimation based on Second-Order Cyclostationary Features"; Wight State University. Publication [online], Dec. 1, 2015 [retrieved Apr. 23, 2018], Retrieved from the Internet: <URL:https://etd.ohiolink.edu/!etd.send_file?accession=wright1448386709&disposition=inline >; pp. 1-39.

Written Opinion of the International Searching Authority for Application No. PCT/US2019/032845, dated Apr. 21, 2020, 10 pages.

* cited by examiner

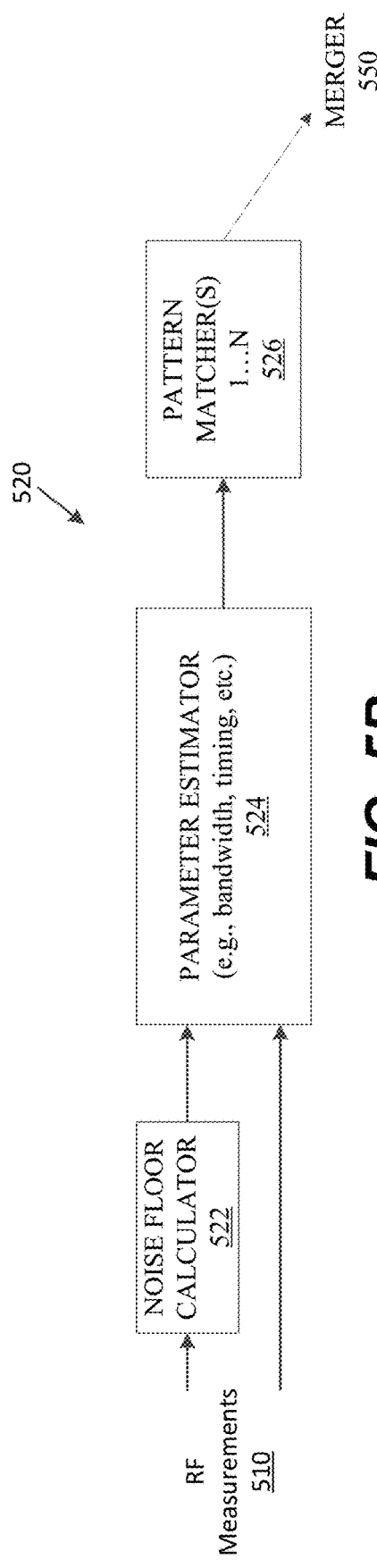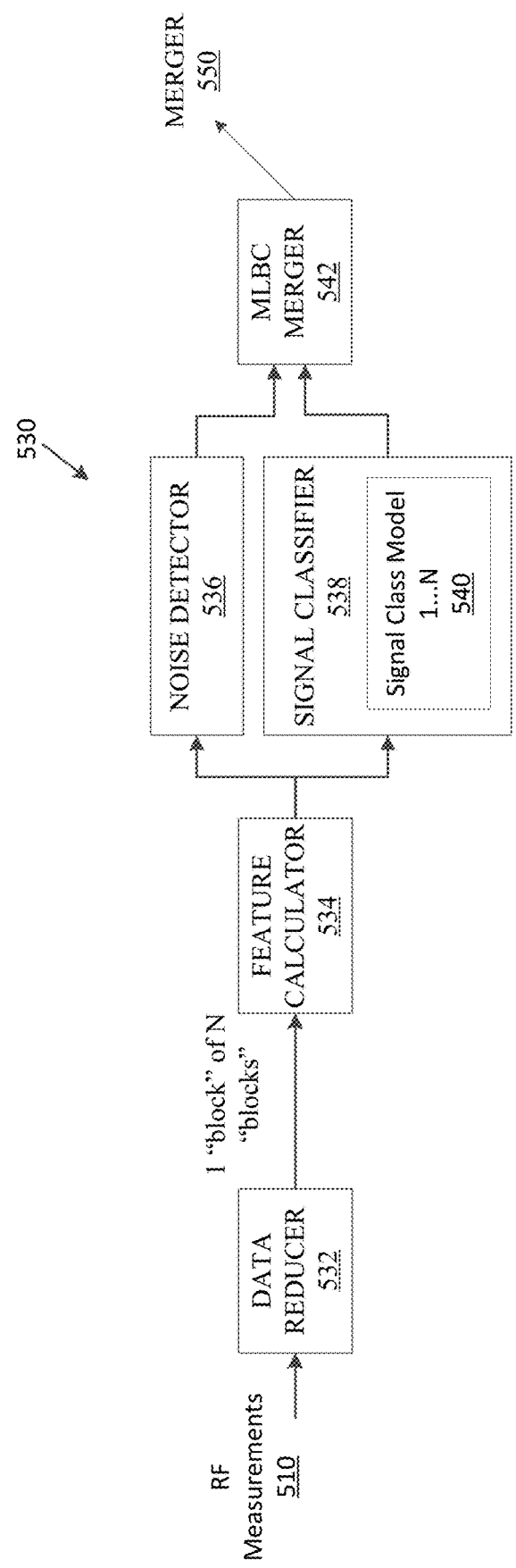

WIRELESS SIGNAL MONITORING AND ANALYSIS, AND RELATED METHODS, SYSTEMS, AND DEVICES

CROSS-REFERENCE TO RELATED APPLICATIONS

This application is a continuation-in-part of International Patent Application PCT/US2018/022639, filed Mar. 15, 2018, which claims the benefit of the filing date of U.S. Provisional Patent Application Ser. No. 62/472,387, filed Mar. 16, 2017, for "SYSTEM, METHOD, AND APPARATUS FOR WIRELESS FREQUENCY SIGNAL IDENTIFICATION AND PROTOCOL REVERSE ENGINEERING," the disclosure of which is hereby incorporated herein in its entirety by this reference. This application is also a continuation-in-part of International Patent Application PCT/US2019/032845, filed May 17, 2019, which claims the benefit of the filing date of U.S. Provisional Patent Application Ser. No. 62/800,251, filed Feb. 1, 2019, for "WIRELESS ENVIRONMENT MONITORING, AND RELATED METHODS, SYSTEMS, AND DEVICES," and also claims the benefit of the filing date of U.S. Provisional Patent Application Ser. No. 62/673,545, filed May 18, 2018, for "SPECTRUM MONITORING AND ANALYSIS, AND RELATED METHODS, SYSTEMS, AND DEVICES," the disclosures of which are hereby incorporated herein in their entirety by this reference.

STATEMENT REGARDING FEDERALLY SPONSORED RESEARCH OR DEVELOPMENT

The invention was made with government support under Contract No. DE-AC07-05-ID14517, awarded by the United States Department of Energy. The government has certain rights in this invention.

TECHNICAL FIELD

Embodiments of the present disclosure relate, generally, to systems and methods for identifying wireless signals and protocols, and more particularly, systems and methods for protocol reverse engineering of wireless signals.

BACKGROUND

Wireless communications technology is becoming ubiquitous throughout society. Although Wi-Fi has grown to be the ubiquitous Internet access technology, many other wireless protocols are used, for example, wireless communication systems such as BLUETOOTH®, Wi-Fi, cellular, Apple iBEACON®, Z-WAVE®, and ZIGBEE®. Wireless communications devices are widely used in residential homes, in public safety, emergency response, and critical infrastructure applications.

Widespread use of wireless technology raises security concerns. Unauthorized third parties may attempt to access or intrude into wireless devices and wireless networks illegally. If third-parties do access wireless devices or wireless networks, the security of computers and data is at risk.

Shared spectrum is a model for efficient usage of the wireless spectrum given an ever expanding telecommunication industry and an expanding wireless revolution fueled by emerging infrastructures like IoT (internet of things), autonomous cars, and smart medical devices. For example, the spectrum access system (SAS) model for 3.5 GHz band is intended for naval radars. According to the SAS model, the incumbent users (e.g., naval radars) are guaranteed to have a highest priority and interference-free access of the band while priority access license (PAL) users (e.g., mobile service providers) have prioritized access of the band when incumbents are absent. The band can also be used by generalized authorized access (GAA) (e.g., WiFi) users for whom no priority and interference-free environment is guaranteed.

The inventors of this disclosure foresee a need for efficient techniques and tools for detecting and classifying wireless signals that are useable across a variety of transmission environments. Moreover, the inventors of this disclosure foresee a need for efficient mechanisms and protocols for detecting the presence of incumbent transmitters, channel allocation among PAL users, and spectrum usage enforcement among PALs and GAAs with the tiered access.

Moreover, understanding the surrounding wireless/radio-frequency (RF) environment is a long coveted ability. Early it was for military and defense applications, but with the tremendous increase in the use of wireless devices, the ability to understand wireless environments is becoming a necessity. For example, wireless devices are increasingly being used in modern industrial facilities for automation, monitoring and control of equipment, inventory tracking, and more. There is a growing need for continuous monitoring of wireless signals to identify anomalous wireless usage in industrial facilities, power substations, and nuclear plants, to name a few needs, where, for example, a personal device or external device may interfere with and/or disrupt a wireless system and even lead to hazardous results.

The inventors of this disclosure foresee a need for systems for monitoring wireless environments and detecting and classifying wireless signals that are useable across a variety of wireless environments. Moreover, the inventors of this disclosure foresee a need for systems for monitoring wireless environments that are robust and flexible enough to adapt to changes in a wireless environment, especially changes that occur in critical infrastructure.

Moreover, the inventors of this disclosure foresee a need for monitoring systems that may be deployed quickly into a variety of wireless environments, and that automatically tune to a wireless environment.

BRIEF SUMMARY

Some embodiments of the present disclosure relate to a computer-implemented wireless signal classification method. The method may include: receiving a first wireless signal classification, the first wireless signal classification based on blocks of radio frequency (RF) measurements of a wireless spectrum over a period of time; receiving a second wireless signal classification, the second wireless signal classification based on part of the blocks of RF measurements; weighting the first wireless signal classification and weighting the second wireless signal classification; and merging the weighted first wireless signal classification and the weighted second wireless signal classification to arrive at a classification result.

Some embodiments of the present disclosure relate to a system. The system may include an energy-based detector configured to analyze an entire set of measurements and generate a first signal classification result; a cyclostationary-based detector configured to analyze less than the entire set of measurements and generate a second signal classification result; and a classification merger module configured to merge the first signal classification result and the second signal classification result.

BRIEF DESCRIPTION OF THE DRAWINGS AND EXHIBITS

Purposes and advantages of the embodiments of the present disclosure will be apparent to one of ordinary skill in the art from the specification in conjunction with the appended Drawings and Exhibits:

FIG. 5B is a block-diagram of an energy-based detection path according to an embodiment of the disclosure.

FIG. 5C is a block-diagram of a machine-learning-based detection path according to an embodiment of the disclosure.

DETAILED DESCRIPTION

Figure 1:
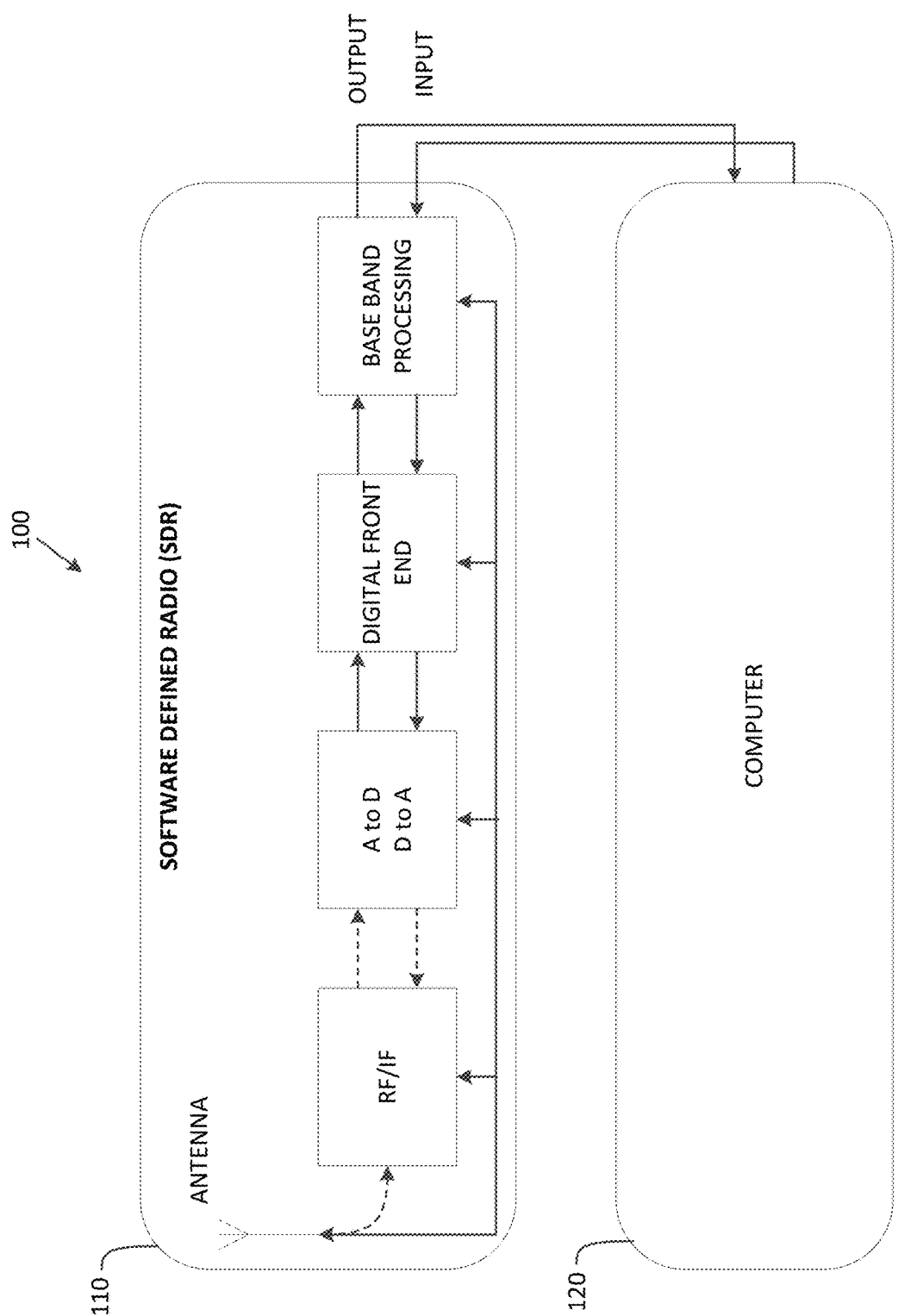
FIG. 1 is a block-diagram of a classification node according to an embodiment of the disclosure.

In the following detailed description, reference is made to the accompanying drawings, which form a part hereof, and in which are shown, by way of illustration, specific example embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

It will be readily understood that the components of the embodiments as generally described herein and illustrated in the drawings may be arranged and designed in a wide variety of different configurations. Thus, the following description of various embodiments is not intended to limit the scope of the present disclosure, but is merely representative of various embodiments.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

Thus, specific implementations shown and described are only examples and should not be construed as the only way to implement the present disclosure unless specified otherwise herein. Elements, circuits, algorithms and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Information and signals described herein may be represented using any of a variety of different technologies and techniques. For example, data, instructions, commands, information, signals, bits, and symbols that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

As used herein, the terms "substantially" and "about" in reference to a given parameter, property, or condition means and includes to a degree that one of ordinary skill in the art would understand that the given parameter, property, or condition is met with a degree of variance, such as within acceptable manufacturing tolerances. For example, a parameter that is substantially or about a specified value may be at least about 90% the specified value, at least about 95% the specified value, at least about 99% the specified value, or even at least about 99.9% the specified value.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

The various illustrative logical blocks, modules, engines, and circuits described in connection with the embodiments disclosed herein may be implemented or performed with a general purpose processor, a special purpose processor, a Digital Signal Processor (DSP), an Application Specific Integrated Circuit (ASIC), a Field-Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of processors, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

Here, the terms "computer" and "computer system" are to be understood to include at least one non-transitory computer readable memory and at least one processor. In general, the memory will store, at one time or another, at least portions of an executable program code, and the processor(s) will execute one or more of the instructions included in that executable program code. It will be appreciated that the term "executable program code" and the term "software" mean substantially the same thing for the purposes of this description. It is not necessary to the practice of the various embodiments described herein that the memory and the processor be physically located in the same place. That is to say, it is foreseen that the processor and the memory might be distributed among physical pieces of equipment or even in geographically distinct locations.

Also, it is noted that the embodiments may be described in terms of a process that is depicted as a flowchart, a flow diagram, a structure diagram, or a block diagram. Although a flowchart may describe operational acts as a sequential process, many of these acts may be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Several situations have been identified that give rise to security concerns for wireless networks and wireless communications:

First, wireless systems are deployed in critical infrastructures and the vulnerabilities of these wireless systems increases the vulnerability to these sectors and of the economy. For example, wireless communication is used in critical infrastructure (CI) applications for monitoring and providing data on the status of CI components and for intelligent transportation systems. Malicious actors may compromise existing wireless devices or implant rogue wireless devices (RWDs) to feed false data to the operators of an operator station creating the potential for a catastrophe.

Second, business entities, government facilities, critical infrastructure, and homes are not "aware" of the wireless activities that surround them, or the vulnerabilities that such activities enable. They may not be aware that they are being hacked or compromised, or that they experience wireless interference (intentionally or unintentionally).

Third, traditionally wireless messages have moved through the free-space environment on certain spectrum allocations, which have been scarce, heavily regulated, and often unattainable resources. However secondary users are increasingly permitted to use licensed bands by way of dynamic spectrum allocation (DSA) system that enable the secondary use when the primary users are not using those bands. Secondary users (and primary users) may violate spectrum allocation policies (e.g., regulations).

Fourth, the government or other organizations/entities may acquire so-called "black box" devices having wireless behavior (blind protocol) that is unknown. While spectrum analyzers may be used to analyze specific frequency ranges, first a user must know the spectrum ranges to analyze. It is difficult to capture a signal over time by a spectrum analyzer, the volume of data is large, and post processing (analyze the signal afterwards) resource intensive, accordingly, it is not possible to do it in real time analysis.

In high-security and control-system environments such as nuclear plants, power plants, military facilities, and other CI, the wireless signal types may be restricted to just a limited number of authorized types for security reasons. In such environments the presence of unauthorized wireless signals or the absence of authorized signals may indicate malicious activities or a problem that must be addressed quickly to avoid a breach or system failure.

Similarly, the presence of unknown signals in an enterprise building might indicate malicious activities like the presence of wireless spying devices that may compromise an organization's confidential data and/or critical assets.

Accordingly, some embodiments of the present disclosure are related, generally, to an efficient wireless signal classification system capable of detecting known signal types as well as unknown signals in real-time. In some embodiments, the classification system may operate in conjunction with or be incorporated in detection systems, which detect problems in timely manner, raise alerts, and/or take appropriate actions. Embodiments of a classification system may also be used to analyze black box devices to show that the devices act as intended (or as indicated), with no additional signals or interference being generated. Other embodiments relate to a real-time wireless signal classification system used in, or operating in conjunction with, shared spectrum applications for detecting the presence of incumbent transmitters and/or spectrum usage violations by secondary users. Embodiments also have a number of additional functionalities, including but not limited to signal recording, blind signal analysis, signal demodulation, signal localization, and protocol reverse engineering. As noted throughout the present disclosure, embodiments of the classification system may be used either as a standalone system or as a system integrated into other systems.

Having come to understand these and similar security concerns, embodiments of the present disclosure facilitate real-time monitoring and analysis of: (1) CI applications that rely on wireless communication, (2) devices to detect possible spectrum violations, and (3) wireless signals in general to detect and interact with RWDs. Other benefits and advantages also exist.

Users may interact with the computer systems described herein by way of graphical user interfaces (GUI) on a display and input devices such as touchscreens, keyboards, a computer mouse, touchpads, and the like.

Embodiments of the monitoring techniques described herein, generally, comprise signal detection and signal classification. Energy-based detection (EBD) is known to the inventors of the present disclosure to provide an efficient technique to detect signals. EBD may detect a signal based on the energy observed in a received signal. The detection process can be done in time-domain as well as frequency domain.

However, it is now understood by the inventors of the present disclosure that EBD is not always accurate due to difficulties in determining the noise floor and exhibits poor performance when finding signals close to or below the noise floor. An alternative approach to EBD is feature-based detection, as a non-limiting example of feature-based detection, cyclostationary-based detection (CBD). Generally, CBD involves extracting cyclostationary features from a signal. Cyclostationary features are periodic characteristics of a signal that result from modulation, sampling, multiplexing, and/or coding operations. These characteristics are unique for signal types and may be used to distinguish among signal types. Generally, cyclostationary features may be extracted from a signal by correlating a signal with a delayed version of itself, wherein a high correlation will be seen when the delay is equal to a period of a Cyclostationary feature. Cyclostationary features of a signal may be represented by Spectral Correlation Functions (SCFs), which may be computed using a time smoothing method and FFTs, an FFT accumulation method, a strip spectral correlation analyzer, etc. Additional computations involving the SCF may be used to determine which shift(s), $\alpha$, provides higher correlation. A resulting N-sized array may be referred to as the $\alpha$-profile that includes maximum values for all possible shifts, $\alpha$. Conventional CBD is very accurate, but computationally expensive, and so not well suited to real-time signal detection.

Figure 2A:
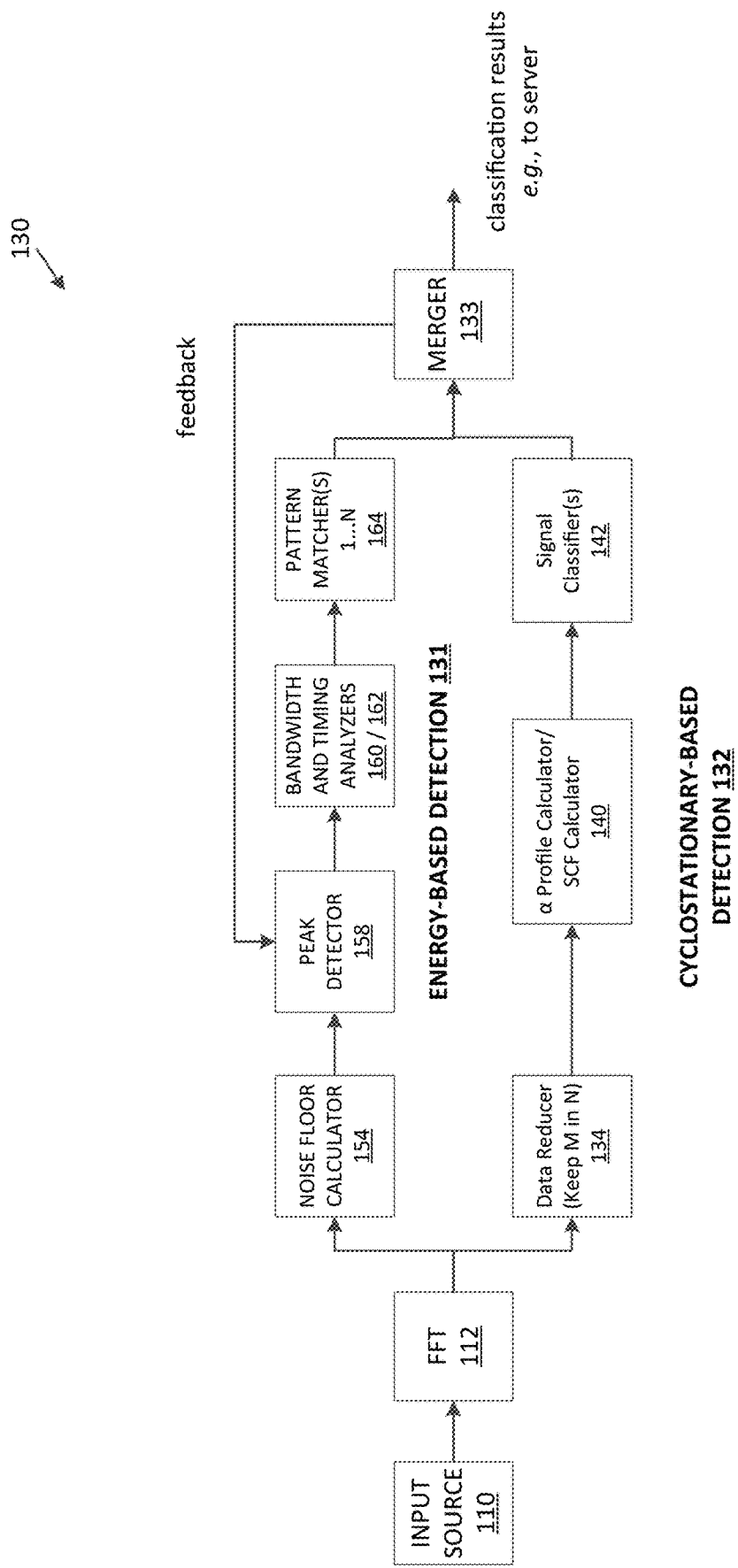
FIG. 2A is a block-diagram of a classification and detection system according to an embodiment of the disclosure.

Various embodiments of the disclosure apply both EBD and a modified CBD (M-CBD) to signals and merge the results of each process to detect and classify the signals. Such embodiments are both efficient and accurate and maintain real-time detection capabilities. With reference to FIG. 2A, in these embodiments, the EBD path 131 is used continuously, while the M-CBD path 132 is "on" periodically but (relative to EBD) infrequently. The results from the M-CBD path 132 are provided as feedback to the EBD path 131 to adjust parameters and improve detection accuracy. In addition, the M-CBD path 132 may detect signals not detected by the EBD path 131 (e.g., because the signals are close to or below the noise floor).

FIG. 1 illustrates an embodiment of a classification node 100 according to an embodiment of the present disclosure. The classification node 100 comprises a software defined radio (SDR) 110 and a computer 120. In various embodiments, the architecture of the SDR 110 is of a type known to those of ordinary skill in the art, and each module in the SDR 110 may be implemented in software, hardware, an embedded system, and combinations thereof. Software components of the SDR 110 may be executed on a general purpose computer. By way of non-limiting example, the SDR 110 software may be based on GNU Radio, GNU Radio Companion, and GNU Radio Blocks. By way of non-limiting example, hardware implementations of the SDR 110 may be based on USRP B210, X310, HackRF One, and the like. Various embodiments of the SDR 110 may utilize application programming interfaces (API) from C++ and/or the software components associated with GNU Radio (or one of the other packages noted above) to interact with the hardware of X310 (or one of the other architectures noted above).

Figures 2B, 2C:
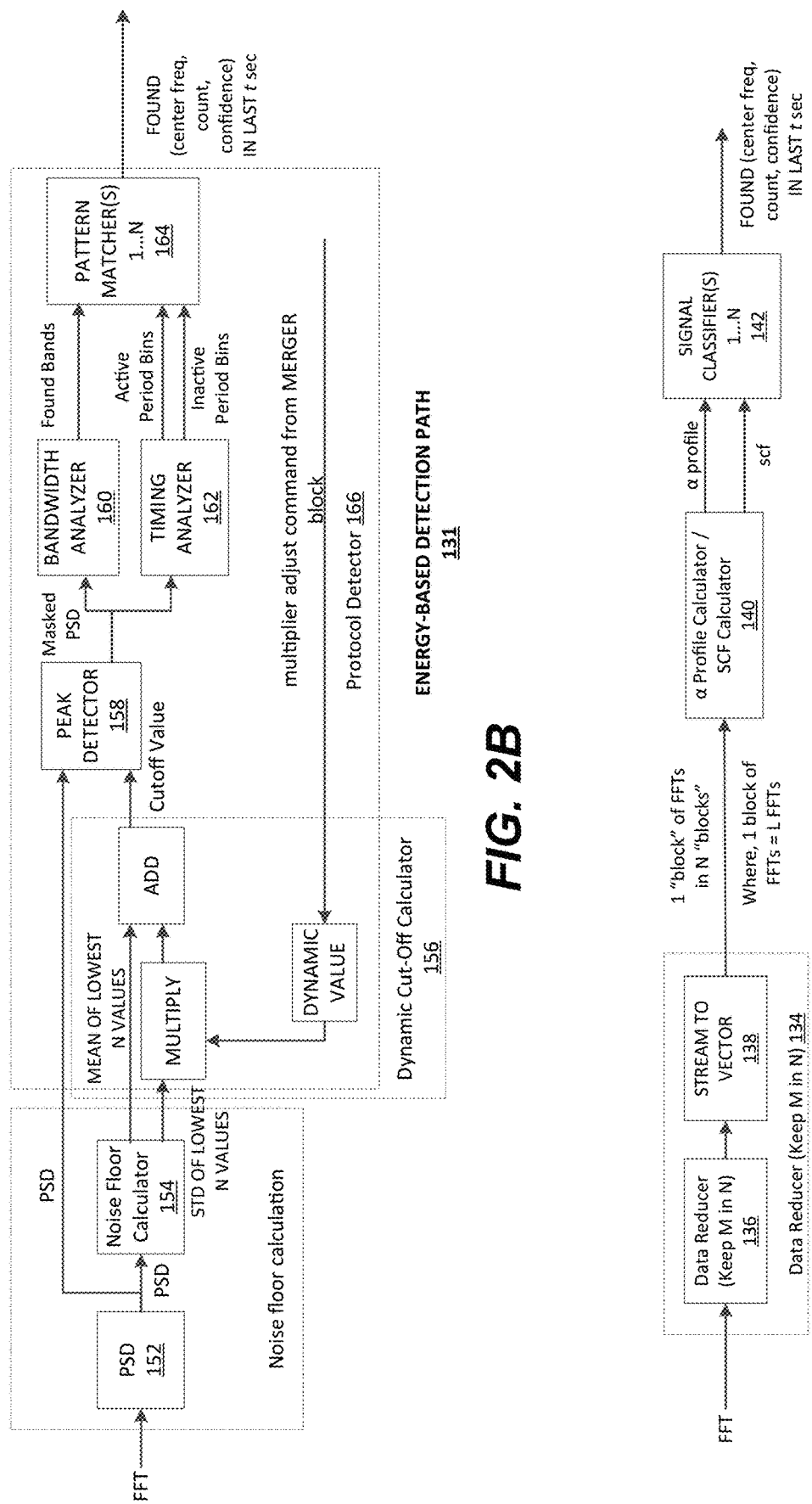
FIG. 2B is a block-diagram for an energy-based detection path according to an embodiment of the disclosure.
FIG. 2C is a block-diagram of a cyclostationary-based detection path according to an embodiment of the disclosure.

The SDR 110 outputs sampled RF signals to the computer 120. In one embodiment, the computer 120 includes classification logic, including, in one embodiment, the classification and detection system 130. Embodiments of the classification and detection system 130 are illustrated in FIGS. 2A, 2B and 2C. The classification and detection system 130 illustrated in FIG. 2A includes an EBD path 131 and an M-CBD path 132. The EBD path 131 is illustrated with more detail in FIG. 2B, and the M-CBD path 132 is illustrated with more detail in FIG. 2C. The computer 120 is not limited to sampled RF signals received from an SDR, and may receive measurement information from other spectrum measurement sources, including, by way of non-limiting example, other spectrum capture devices, files (e.g., stored measurement information), network equipment (e.g., received over a network), and the like.

In one embodiment, the EBD path 131 may include power spectral density (PSD) calculator 152, noise floor calculator 154, dynamic cutoff calculator 156, peak detector 158, bandwidth analyzer 160, timing analyzer 162, and pattern matcher 164.

In one embodiment, the PSD calculator 152 is configured to calculate the PSD from an FFT 112 and pass the PSD to the noise floor calculator 154 as well as the peak detector 158.

In one embodiment, the noise floor calculator 154 may be configured to receive the PSD values (bins), find the lowest n values of that PSD and compute a mean and standard deviation of those n values, thereby enabling dynamic calculation of the noise floor continuously at runtime. The mean and standard deviation may be provided to the peak detector 158.

In one embodiment, the dynamic cutoff calculator 156 may be configured to determine a cutoff to remove noise from a PSD value. The cutoff used to remove noise from a PSD value may be $\mu+m*\sigma$, where $\mu$ and $\sigma$ are the mean and standard deviation values obtained from the noise floor calculator 154 module, respectively, and m is a multiplier which may be adjusted by feedback. The dynamic cutoff may be provided to the peak detector 158.

In one embodiment, the peak detector 158 may be configured to determine and send a mask of the bins that were above the specified cutoff to bandwidth analyzer 160 and timing analyzer 162.

In one embodiment, the bandwidth analyzer 160 may be configured to compute sets of contiguous bins above the cutoff using the mask received from the peak detector 158. For every set of inputs the bandwidth analyzer 160 receives, it looks for contiguous sets of bins that are above a threshold by looking for contiguous 1's (or another predefined indicator) in the mask it received from the peak detector 158.

In one embodiment, the timing analyzer 162 may be configured to track active and inactive intervals for each bin, separately. A bin may be considered active if it was considered part of a signal by the peak detector 158, and a bin may be considered inactive otherwise. Information about the amount of time bins were active and inactive (after a state change) may be provided as output from the timing analyzer 162. In one embodiment, the timing analyzer 162 may include a two-state state machine (not shown) that it maintains for every entry in the mask it receives from the peak detector 158. By way of non-limiting example, responsive to a value of 1 for a particular mask entry, the state machine for that entry enters or maintains an active state. Likewise, responsive to a value of 0 for a particular mask entry, the state machine for that entry enters or maintains an inactive state. Responsive to a state transition between states for an entry, an output entry for the state from which the entry left may be created and sent to an associated pattern matcher 164.

In one embodiment, the pattern matcher(s) 164 may be configured to determine if a particular signal is present or not based on comparing the received bandwidth and/or timing results received from the previous blocks against a known set of parameters for the signal (i.e., against predefined pattern(s) for the signal). By way of non-limiting example, an IEEE 802.11g signal using OFDM uses approximately 16.6 MHz of spectrum, so the pattern is matched against bands found by the bandwidth analyzer. Similarly, timing patterns such as Short Interframe Spacing (SIFS) inactive intervals and active transmission times required for packets based on various data rates are compared against inactive and active timing information found by the timing analyzer 162. On the other hand, the ZIGBEE® pattern matcher takes just the bandwidth information from the bandwidth analyzer 160 and compares it against the expected 2 MHz of spectrum occupancy for ZIGBEE®.

In one embodiment, upon detecting a match, the pattern matcher(s) 164 may be configured to compute a classification score of the classification for a band (s, f) using Equation 1:

$$score_{s,f} = \frac{count_{s,f}}{\max_{b \in B} count_{s,f}} \quad \text{Equation 1}$$

Where $count_{s,f}$ is the number of times band s, f has appeared since the last update, and $$\max_{b \in B} count_{s,f}$$

is the maximum number of times any band has appeared since the last update. For example, if $band_1$ has appeared one time since the last update and $band_2$ has appeared five times since the last update, the classification score of $band_1$ is 1/5=0.2, while the classification score of $band_2$ is 5/5=1.0. Results may be stored for a set time period, $t_0$, before being provided to the merger 133. By way of non-limiting example, the results may include signal types, frequencies, scores, counts for detected signals, and the like.

Notably, embodiments of the peak detector 158 and protocol detector 166 may be configured based on specific wireless protocols (e.g., 802.11(b), ZIGBEE®). For multiple protocols, multiple peak detector modules, protocol detector modules and/or components thereof, each configured for a signal class may be used. For example, a first pattern matcher 164 may be configured with band and timing information for 802.11g, and another pattern matcher 164 may be configured with bandwidth information for ZIGBEE® (which occupies a specific 2 MHz spectrum). In other embodiments, a classification system including an EBD path may include a protocol detector for each protocol.

Embodiments of the merger 133 of the classification and detection system 130 are configured to take the classification results from both the EBD path 131 and the M-CBD path 132 and merge the results for a final classification. The classification results may include a center frequency, a signal classification, count and a classification score. Both EBD path 131 and M-CBD path 132 may also provide information about the scores of the classifications they make. Score levels are in the range (0:0; 1:0] where a value around 0.0 corresponds to a very low confidence in a classification and a value near 1.0 corresponds to a very high confidence in the classification.

In some embodiments, the merger 133 may be configured to apply pre-defined score weights to results from the two paths to make a final classification. Since the M-CBD path 132 provides higher accuracy of signal classification than the EBD path 131, the merger 133 may be configured to assign a higher weight to the results from M-CBD path 132 while merging the results.

The merger 133 may be initialized with classification score weights for the different classification sources (i.e., M-CBD and EBD classification) and an update rate. The merger 133 may be configured to switch between two states, a merging state and an update state.

The merger 133 may be in a merging state between updates. During the merging state, it receives classification results from the different sources consisting of signal classification, center frequency, classification score, and count. Values from different sources and of different signal class are kept separate, but values from the same source and signal class are merged. If multiple sets of results are be obtained from the same source while the merger 133 is in the merging state then the results are combined/merged. In various embodiments, classifications are merged based on their signal class and center frequency. For every new value received, if the signal class and center frequency match the signal class and center frequency of an existing entry then the entries are merged by updating the score to an average of the existing entry and the new entry, and the count is updated to be the sum of the existing count and the new count. By way of non-limiting example, if an entry for a Wi-Fi signal is found by the M-CBD path 132 located at 2.437 GHz (i.e., the center frequency), having a score of 0.99, and has a count of "3" (because it has been seen 3 times already), and a new entry for a Wi-Fi signal is found by the M-CBD path 132 located at 2.437 GHz, having a score of 0.85, and a count of "1," the merged entry has a score of (3*0.99+1*0.85)/4=0.955 and a count of "4." By way of another non-limiting example, if a new entry does not match an existing entry in terms of center frequency, then the new entry is added to the set of existing entries.

If the merger 133 is in update state, then the previously merged results from the sources are merged to a final classification using the results and source classification score weights specified by the user. For each signal class, the paths that provide classification results are counted and become the number of sources for that signal class. By way of non-limiting example, if only the EBD path 131 or the M-CBD path 132 provided entries for Wi-Fi signals then count(sources(Wi-Fi))=1. However, if both paths provided entries for Wi-Fi signals then count(sources(Wi-Fi))=2. For each center frequency, f, for that signal class, the final merged entry has a score computed as shown in Equation 2, below:

$$\text{score}(f) = \frac{1}{c} \times \sum_{s \in sources(t)} w_s \times score_s(f) \qquad \text{Equation 2}$$

In Equation 2, t is the signal type, c=count(sources(t)), $w_s$=weight(s) (the source weight as specified by the user), and scores (f)=0 if the frequency was not reported by the source, otherwise, it is the classification score value from the merged entry. By way of non-limiting example, if the following entries existed from EBD path 131 and M-CBD path 132, respectively: {(2.437 GHz, 0.99), (2.438 GHz, 0.8)} and {(2.437 GHz, 0.97)}, and if the source weights for the EBD path 131 and M-CBD path 132 are 0.75 and 1.0, respectively, then the final classification entries are: (2.437 GHz, (0.75*0.99+1.0*0.97)/2=0.85625), and (2.438 GHz, (0.75*0.8+1.0*0.0)/2=0.3).

Regarding the form of the classification results output by the merger 133, in various embodiments of the disclosure the entries for each signal class from both sources are provided as results. By way of non-limiting example using generic signal terms, if the M-CBD path 132 finds Wi-Fi bands {1, 2, 3, 4} and ZIGBEE® bands {1, 2}, and the EBD path 131 finds Wi-Fi bands {1, 5, 6} and ZIGBEE® bands {3, 4}, then the final merged results would be Wi-Fi bands {1', 2, 3, 4, 5, 6} and ZIGBEE® bands {1, 2, 3, 4}. For the Wi-Fi bands, 1' is a merged entry.

In some embodiments, the merger 133 may provide feedback control signals to the EBD path 131 based on the results of the M-CBD path 132. Parameters of the Peak Detector may be modified/adjusted based on the feedback. In one embodiment, differences in the classification results reached by the EBD path 131 and M-CBD path 132 are tracked. If the differences are exceed a threshold then commands are sent from the merger 133 to the peak detector module of the EBD path 131 and a cutoff multiplier used in peak detection is adjusted. By way of non-limiting example, if the EBD path 131 reports detection and classification of eight (8) Wi-Fi bands, but the M-CBD path 132 reports detection and classification of three (3) Wi-Fi bands, a command is sent to the peak detector module to increase the noise floor cutoff parameter by adjusting the multiplier. However, if the M-CBD path 132 reports detection and classification of eight (8) Wi-Fi bands and the EBD path 131 reports detection and classification of three (3) Wi-Fi bands, then a command is sent to the peak detection module to lower the noise floor cutoff parameter by adjusting the multiplier. This allows the classification and detection system 130 to adapt at run time and be less susceptible to bad initialization parameters.

FIG. 2C shows classification logic of the M-CBD path 132, in accordance with the present disclosure. The M-CBD may include the following modules: a data reducer 134, a Spectral Correlation Function (SCF)/α-profile calculator 140 (merely referred to herein as an α-profile calculator), and a signal classifier 142.

Regarding the data reducer 134, it is now understood by the inventors of the present disclosure that a CBD typically cannot keep-up with the high-sample rates of SDRs such as the SDR 110. By way of non-limiting example, an SDR such as SDR 110 may generate 2 GB of data every 11 seconds at a 25 MHZ sample rate. It is also now understood that lowering the sample rate would result in poor signal detection and classification by the system.

Various embodiments of the M-CBD path 132 may maintain the real-time detection capabilities by, in part, incorporating a data reducer 134. Embodiments of a data reducer 134 module ("keep M in N") are illustrated in FIGS. 2A and 2C. In these embodiments, the data reducer 134 module turns "on" the M-CBD path 132 periodically as opposed to continuously "on" like the EBD path 131. In one embodiment, the limited operation is achieved by forming blocks of data where one block has enough contiguous samples to calculate one SCF, forwarding the one block to the next module, and discarding the remaining blocks. The size of a block (c samples) is N*L where N is the number of bins from the fast Fourier transform (FFT) and L is the number of contiguous FFTs used to compute one SCF. In some embodiments, the data reducer 134 may implement a data reduction algorithm to select the first, last, nth, or a random block from the available N blocks to send to the next module. In one embodiment, un-forwarded blocks may be discarded. Random selection may avoid a situation where a signal is always transmitted during an off-period of the M-CBD path 132 and so is always missed by the M-CBD path 132. Random selection may also hinder third-parties from evading detection by taking advantage of the "on" "off" periods of the M-CBD path 132.

FIG. 2C shows the data reducer 134 includes a data reducer 136 and a stream to vector 138 that is configured to collect the blocks of sampled data and provide the blocks to the α-profile calculator 140.

In some embodiments the computer 120 (FIG. 1) may include additional random-access-memory (RAM) to improve the operational speed of the EBD path 131 and/or the M-CBD path 132. The higher read/write speeds of the RAM enable the computer 120 to keep up with the high rates at which data may be generated by the SDR.

Embodiments of the α-profile calculator 140 may be configured to compute an SCF and an α-profile to be used for signal classification by the signal classifier 142. In one embodiment, the α-profile calculator may be configured to use a time smoothing process, such as Equation 3, below:

$$SCF(f, \alpha) = \frac{1}{L} \sum_{l=1}^{L} FFT_l[f] x FFT_l^*[f - \alpha] \qquad \text{Equation 3}$$

Where, $FFT_l[f]$ is the lth FFT of a signal at frequency f, and $FFT_l^*[f-\alpha]$ is the complex conguate of the FFT of the signal at frequency bin, f shifted by α. The α-profile may calculated according to Equation 4, below:

$$y = \max_\alpha SCF(f, \alpha) \qquad \text{Equation 4}$$

The α-profile calculator 140 normalizes the computed α-profile by dividing all the entries with a maximum valued entry. The α-profile calculator 140 then passes the SCF and α-profile to multiple signal classifiers 142 for identification of the signal class. The forwarded α-profile is used to predict the signal class part of the SCF is used to estimate the center frequency of a detected signal.

Embodiments of the signal classifier 142 may be configured to classify the detected signals based on the SCF and α-profile provided by the α-profile calculator 140, and provide the classification results to the merger 133 of FIG. 2A. The signal classifier 142 for signal class c, receives an α-profile and uses it as a feature vector to determine if it belongs to class c (or not).

In one embodiment, the signal classifier makes the classification determination by using a previously trained one-class support vector machine (SVM) model. SVM are known to one of ordinary skill in the art of machine learning as a technique to find an optimal hyperplane separating different classes of data. A one-class version of SVM is trained with data from just one "class," learns the boundary of the class from the training data, and predicts if an input feature set belongs to the trained class (or not).

In another embodiment, the signal classifier 142 uses a multi-class classifier model trained with different signals and noise data. In this embodiment, to add support for a nth signal class the model is trained with previous data for 1, 2, . . . , n−1 classes and added data for class n.

The signal classifier 142 next computes the center frequency from the SCF if the prediction from the one-class SVM is 1, i.e., the input feature vector is predicted to belong to the signal class c. In one embodiment, the computation is performed using the 0th column of the SCF which contains the magnitudes of the input FFTs averaging over L FFTs. In one embodiment, this computation is carried out as follows: First, the 0th column is divided into blocks. Next, the signal classifier 142 sends two blocks that contain the most amount of the energy (or are above a threshold amount of energy). Next, the signal classifier 142 finds the location of a minimum value in a region bounded by the two blocks. This location is saved as the target center frequency location.

In one embodiment, to reduce computation, the signal classifier 142 stores the found center frequencies instead of immediately passing it to the merger 133. After a set time period s, the signal classifier 142 merges the stored results and outputs the merged information to the merger 133. While merging, for each different frequency, f, the signal classifier 142 determines the number of times f has been detected in period s and uses the count to calculate a classification score for f following a similar calculation as a protocol detector module of the EBD path 131. Like the EBD path 131, the signal classifier 142 may send streams of detected signal data (signal class, frequency, score, count) to the merger 133.

In various embodiments of the classification logic of the M-CBD path 132, the system may have multiple instances of a signal classifiers 142, each programmed/configured to detect a particular signal class and to work in parallel. By way of non-limiting example, one module configured to detect Wi-Fi, one configured to detect ZIGBEE®, etc.

It is specifically contemplated that the data reduction algorithm and the memory may be selected based on factors such as the sample rate of an SDR and the quantity of data it generates. These factors may necessitate different architecture based on different applications. For example, a system may comprise of multiple SDR, each SDR scanning different RF bands to detect different classes of wireless signals. The reverse engineering techniques described herein may be optimized for different classes of wireless signals and as such the architecture may be selected to accommodate a class of wireless signal.

Figure 3:
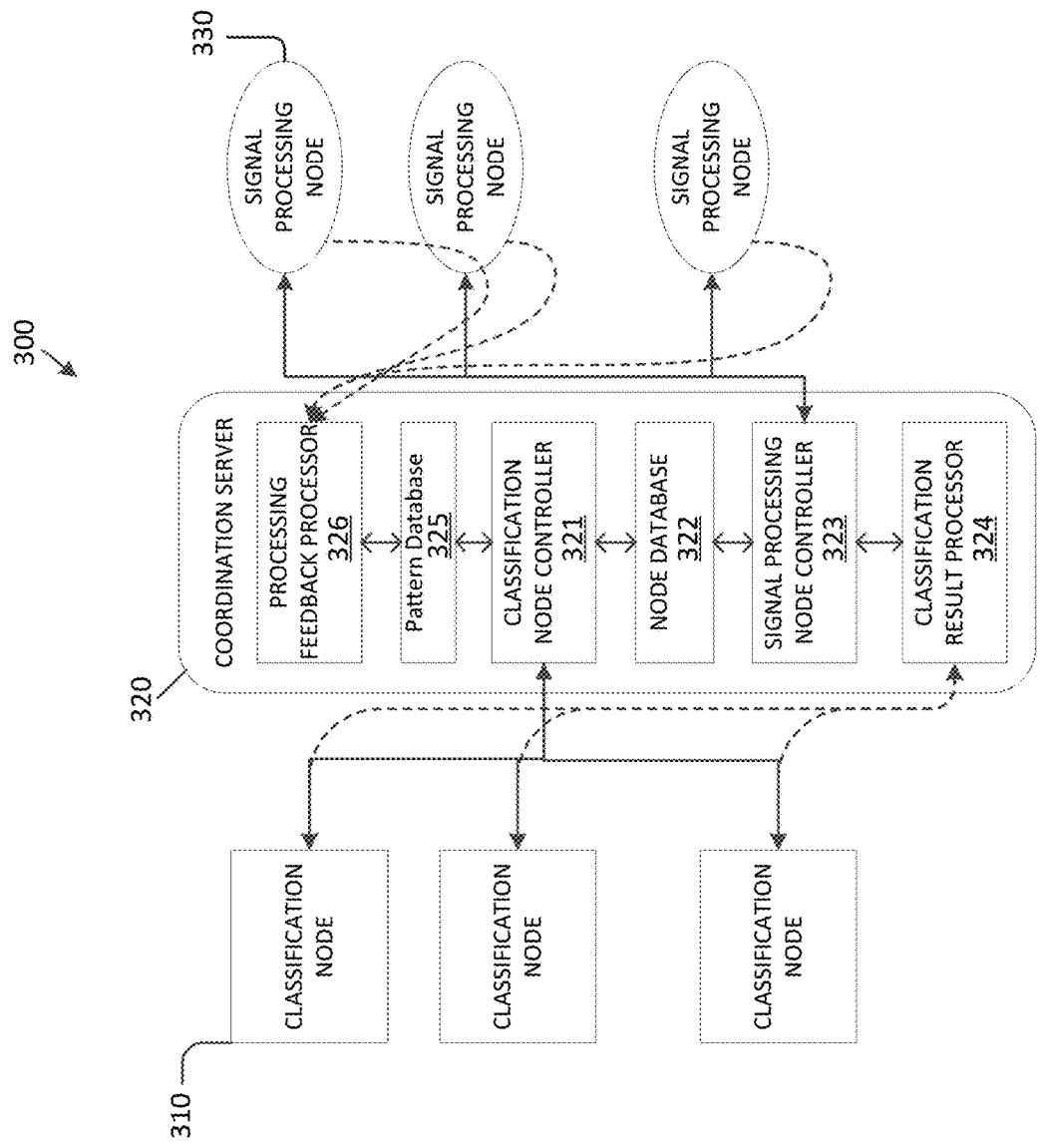
FIG. 3 is a block-diagram of a classification and capture system according to an embodiment of the disclosure.

FIG. 3 illustrates a classification and capture system (CCS) 300 according to an embodiment of the present disclosure. The CCS 300 includes classification nodes 310, a coordination server 320 and signal processing nodes 330. Each classification node 310 may include classification logic implemented, in one embodiment, in the manner(s) described with references to FIGS. 1, and 2A to 2C, above. Each classification node 310 may include classification logic optimized for a particular signal class. In some embodiments, classification nodes 310 may be added to the CCS 300 for new or different signal classes, and thus, the CCS 300 is scalable.

Each classification node 310 may include a registration manager (not shown) that is configured to register the classification node 310 with other devices, including the coordination server 320. In one embodiment, registration indicates to the coordination server 320 that a classification node 310 is a resource available to the coordination server 320, including to receive job requests/commands from the coordination server 320. As part of registration, a classification node 310 may communicate to the coordination server 320 one or more of: the physical location of a classification node 310, identity of ports to receive updates and commands, RF spectrums with scan range and classification range, and the like. The coordination server 320 may communicate to the classification node 310 initial values and patterns. In the case of energy-based detection, the initial patterns may comprise of bandwidth and timing values (active/inactive, short interval spacing, etc.) for known signal classes, and the initial values may include initial cut-off values for the noise. In one embodiment, signal information may be entered manually (e.g., by a user), and in another embodiment signal information may be entered automatically (e.g., using a predefined database or through automated blind signal analysis).

In one embodiment, the classification nodes 310 may include performance monitors configured to monitor for resource (i.e., CPU) usage of a host system as well as detect if processing overload occurs within a classification logic. Processing overload may happen when classification logic is not able to process the stream of samples from the spectrum measurement source fast enough (e.g., we are spending too much computation time on the MLBC path as described below). The performance monitor may be configured to send commands to classification logic, which is configured to make appropriate adjustments responsive to such commands. This enables the CCS 300 to automatically adjust to changes in available resources.

Embodiments of the signal processing nodes 330 may be configured to have different features and functions, including recording a signal and demodulating a signal (or attempting to demodulate a signal). Each signal processing node 330 may comprise of specialized hardware and software, relevant to, for example, one or more signal classes. By way of non-limiting example, a signal processing node 330 that specializes in recording signals (e.g., for reverse engineering, demodulation, localization, etc.) may include an SDR for a specific RF band and memory architecture to record the signal. By way of another non-limiting example, a signal processing node 330 that specialize in demodulation of signals and data packet capture may include demodulation software, including software for demodulating specific signal classes. In one embodiment, a specialty SDR such as USRP B210 may be used to demodulate a signal and capture data packets. In another embodiment, BBN's 802.11 demodulation software is used to demodulate the signal in software and capture data packets.

Each signal processing node 330 may include a registration manager (not shown) that is configured to register a signal processing node 330 with a coordination server 320. In one embodiment, the registration manager may send the signal processing node 330 a registration request that includes information about the capabilities of the signal processing node 330. Once registered, the coordination server 320 may direct a signal processing node 330 to perform additional processing on a signal, for example, responsive to capabilities of the signal processing node 330.

Each signal processing node 330 may include a controller (not shown) that receives commands and parameters from the coordination server 320, and controls the specific resources of the signal processing node 330 responsive to the commands/parameters.

Among the advantages of embodiments of classification nodes 310 is that they may perform auto-tuning for performance using a monitoring function. This allows the classification nodes 310 to automatically adjust based on available computational resources. This also allows a CCS 300 to be put in an operational state with minimal human intervention by automatically taking the necessary steps to determine its best configuration.

Embodiments of the coordination server 320 may include a classification node controller 321, a node database 322, a signal processing node controller 323, a classification result processor 324, a pattern database 325, and a processing feedback processor 326. Various embodiments of the coordination server 320 may be configured to act as a centralized coordination point between the classification nodes 310 and the signal processing nodes 330.

Embodiments of the node database 322 may be configured to be used by the other component modules of the coordination server 320 to store and track registered nodes, node availability, node capability, etc.

Embodiments of the classification node controller 321 may be configured to manage registration/un-registration requests from classification nodes 310. Further, it may be configured to send commands to registered classification nodes 310 to monitor a specific frequency range and report the results to the coordination server 320. In some embodiments, the classification node controller 321 may be configured to update the pattern database 325 with new patterns and signals received, for example, from one or more classification nodes 310.

Embodiments of the signal processing node controller 323 may be configured to manage registration/un-registration requests and work to complete requests from the signal processing nodes 330. The signal processing node controller 323 may also be configured to send commands to signal processing nodes 330 responsive to requests/commands received from the classification result processor 324. In some embodiments, upon receipt of a work complete notification, the signal processing node controller 323 may be configured to inform the classification result processor 324 of the node status change.

Embodiments of the classification result processor 324 are configured to receive classification results from the classification nodes 310 and, responsive to a rules engine (not shown), determine whether to perform further processing of a signal and determine which signal processing node to assign a received signal for further processing. By way of non-limiting example, if the classification result processor 324 determines that a signal should be recorded for further investigation at a later time, it may send a request/command to a recording-type of signal processing node 330 to record a specific center frequency at a specific sample rate for a specific amount of time. Similarly, if the classification result processor determines that a demodulation attempt should be made on a signal, it may send a request/command to a demodulation-type signal processing node to demodulate (or attempt to demodulate) the signal using demodulation software and to capture packet data from the signal.

Embodiments of the pattern database 325 may be configured to store, manage and update patterns used for classification—e.g., by detectors and SCF classifiers—as well as information about the patterns. In some embodiments, the pattern database 325 may store, manage and update information about types of known and unknown signals. Various embodiments of the pattern database 325 may be updated automatically or manually.

Embodiments of the processing feedback processor 326 may be configured to receive feedback from signal and demodulation attempts by one or more signal processing nodes 330. Further, the processing feedback processor 326 may be configured to update the pattern database 325 with patterns based on feedback received from one or more of the signal processing nodes 330.

Although not shown, the coordination server 320 may include one or more interfaces for users and external devices to access and/or communicate with the coordination server 320, including to retrieve classification results, detection results, load information, set configurations, or issue commands. In one embodiment, a user may interact with an interface by way of a graphical user interface or a command line interface.

Embodiments of the coordination server 320 may include core logic (not shown) that interacts with the other modules to run the system as a whole and is configured to decide about system operation. The core logic may be configured to determine actions to take, such as node assignment and additional processing to be taken (activate a signal processing node, alert a user to suspicious activity, etc.), responsive to information received from the other modules, by way of non-limiting example, classification results, detection results, node availability, and user configuration.

Figure 4:
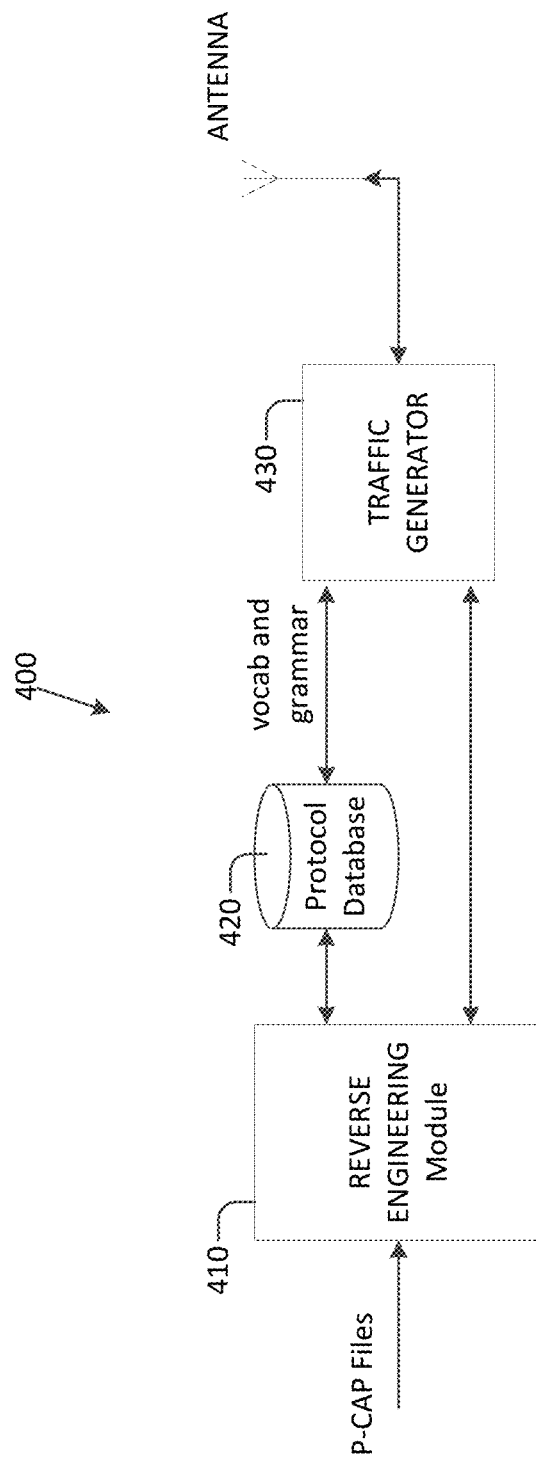
FIG. 4 is a block-diagram of a protocol reverse engineering system according to an embodiment of the disclosure.

FIG. 4 illustrates an embodiment of a protocol reverse engineering system (PRES) 400, in accordance with the present disclosure. The PRES 400 is configured to receive packet capture (P-CAP) files, for example, from a signal processing node 330 (FIG. 3) that has demodulated a signal and captured packet data. Embodiments of the PRES 400 may be implemented as one or more of the signal processing nodes 330 illustrated in FIG. 3, or as a separate application or tool.

Embodiments of the reverse engineering module 410 may be configured to receive the P-CAP files and infer vocabulary and grammar the application layer protocol associated with the received P-CAP files. The reverse engineering module 410 may store the vocabulary and grammar in the database 420 for access by the traffic generator 430.

Embodiments of the traffic generator 430 may be configured to simulate communication traffic for the wireless signals associated with the reverse engineered P-CAP files including over an Antenna. The traffic generator 430 may be programmed to perform simulations based on the vocabulary and grammar previously inferred. Dynamic vulnerability analysis using integrated fuzzing frameworks (mutation based or generation based), such as Sulley or Peach, may be used to generate optimized and specific fuzzing test cases that may reveal software programming errors which can lead to software security vulnerabilities. By way of non-limiting example, the traffic generator 430 may be configured to generate malformed data packets to attempt to crash or disable a device that is operating over a specific wireless signal, and take over a device, as well as assess the robustness of an implementation.

In one embodiment, PRES 400 is implemented in software, for example using the NetZob tool. In other embodiments, the modules of the PRES 400 may be implemented using tools such as ClusterFuzz and American Fuzzy Lop (AFL).

Figure 5A:
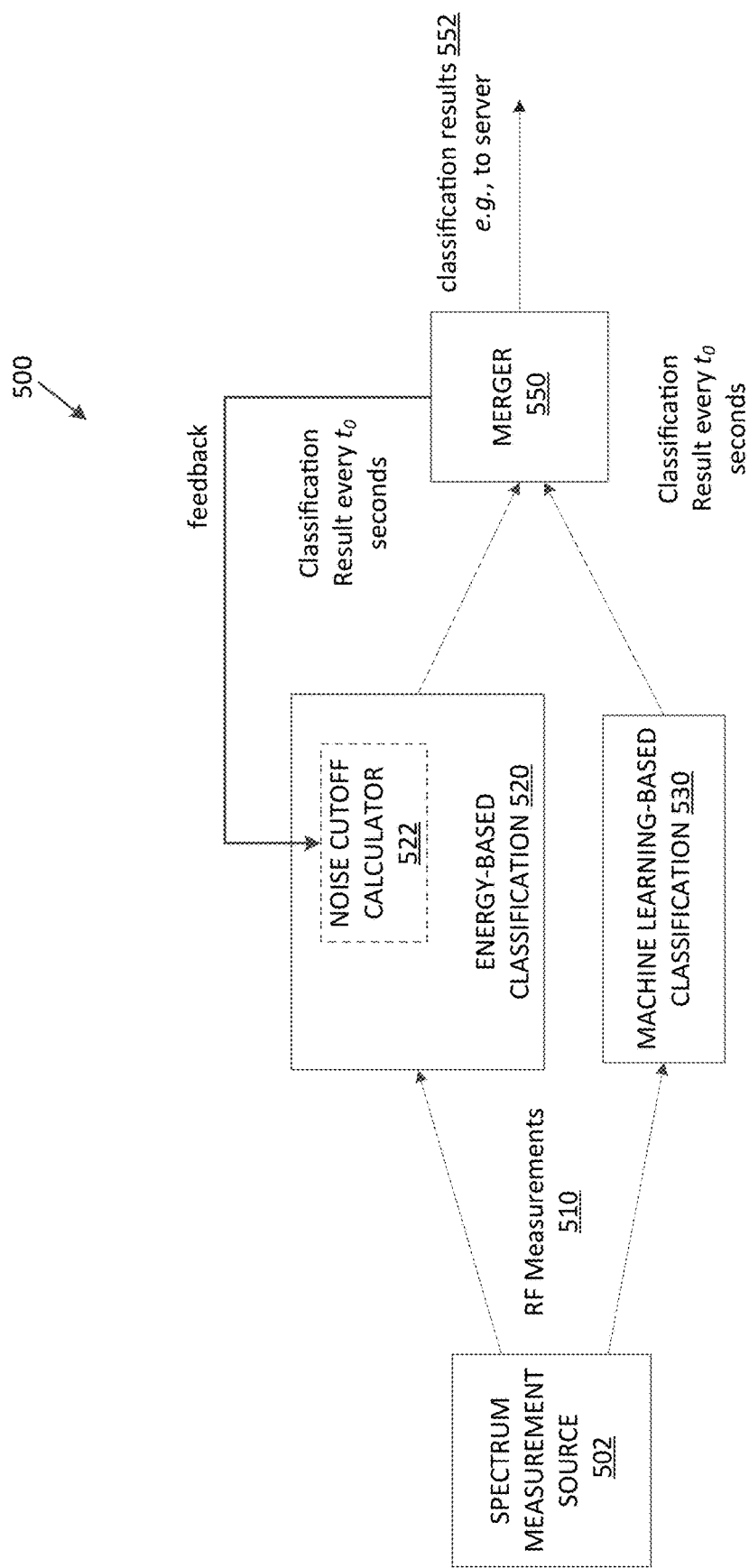
FIG. 5A is a block-diagram of a classification and detection system according to an embodiment of the disclosure.

FIGS. 5A, 5B, and 5C show a classification and detection system 500, in accordance with an embodiment of the disclosure. Embodiments of the classification and detection system 500 may be, by way of non-limiting example, incorporated into a classification and capture system, and a protocol reverse engineering system. The classification and detection system 500 includes different classification logic than the classification and detection system 130. In particular, the classification and detection system 500 may include an energy-based detection classification (EBDC) path 520 and a machine learning-based classification (MLBC) path 530 configured to receive RF measurements 510 from a spectrum measurement source 502. The classification results from the EBDC path 520 and the MLBC path 530 are merged by a merger 550. Merged classification results 552 may be provided to a server (e.g., in a classification or reverse engineering system) the noise floor calculator 522 of the EBDC path 520.

In various embodiments, the spectrum measurement source 502 may provide measurement information (e.g., samples of RF signals) for classification. Non-limiting examples of spectrum measurement sources include, but are not limited to, files and SDRs. The measurements may be processed according to the classification logic and provided, e.g., to a coordination server. The measurements may come from local (e.g., files, attached SDR via USB, etc.) or remote (e.g., sent over a network) sources.

FIGS. 5B and 5C show classification logic associated with the EBDC path 520 and MLBC path 530, respectively, in accordance with an embodiment of the disclosure. Some functional modules of the classification logic of the EBDC path 520 shown in FIG. 5B have been simplified for ease of description, but may include, by way of non-limiting example, one or more of the modules of the classification logic shown FIG. 2B. Here, the EBDC path 520 is shown to include a noise floor calculator 522, a parameter estimator 524, and pattern matchers 526.

As shown in FIG. 5C, the MLBC path 530 includes a data reducer 532, feature calculator 534, a noise detector 536, a signal classifier 538, and an MLBC merger 542. The data reducer 532 and feature calculator 534 may be configured similar to the data reducer 134 and α-profile calculator 140 described with reference to FIG. 2C. Generally, the data reducer 532 is configured to limit the RF measurements 510 that pass to the rest of the modules of the MLBC path 530 to maintain the real-time capability of a classification process. Also generally, the feature calculator 534 may be configured to compute a pre-defined feature set from RF measurements 510, such as cyclostationary, higher order cumulants, etc., that is provided to the noise detector 536 and signal classifier 538. The noise detector 536 may use a pre-trained machine learning model to determine if the input is noise or not. The signal classifier 538 runs in parallel with the noise detector 536, and uses one or more signal class models 540, which may be one-class machine learning models, to determine a signal class. For example, one model may be for detecting WiFi, one model may be for detecting ZIGBEE®, etc. A one-class machine learning model is different than conventional models in that it is trained with data from just one class, "learns" the characteristics of the class from the training data, and predicts if an input feature set belongs to the trained class (or not). Although one of ordinary skill in the art may recognize many advantages or benefits to one-class models, one advantage of an one-class model is that, to detect class A signals, it may be trained with class A data, but does not necessarily need to be trained with non-class A data like conventional machine learning models. For example, to build a model for WiFi, the model does not necessarily need to be trained with noise data and data for other signals, e.g., BLUETOOTH®, ZIGBEE®, etc. —it may only be trained with WiFi data. Advantageously, a representative non-WiFi dataset is not necessarily required, which may be otherwise difficult to create. Non-limiting examples of one-class models that may be used with the signal classifier 538 include one-class SVM, autoencoder neural network, combinations thereof, and the like. MLBC merger 542 may be configured to receive prediction results from both noise detector 536 and signal classifier 538, and to infer a final classification result to be sent to the Merger 550. If noise detector 536 predicts the input as a signal and none of the signal class models 540 recognize it, then an unknown signal type may be considered to be present and the MLBC merger 542 sends a result indicating the logic of the MLBC path 530 did not identify the signal type.

FIG. 1 shows a block diagram of a system 600 for real-time spectrum monitoring and analyzing, in accordance with disclosed embodiments. In various embodiments, system 600 may be a stand-alone system or a sub-system of another system.

Figure 6:
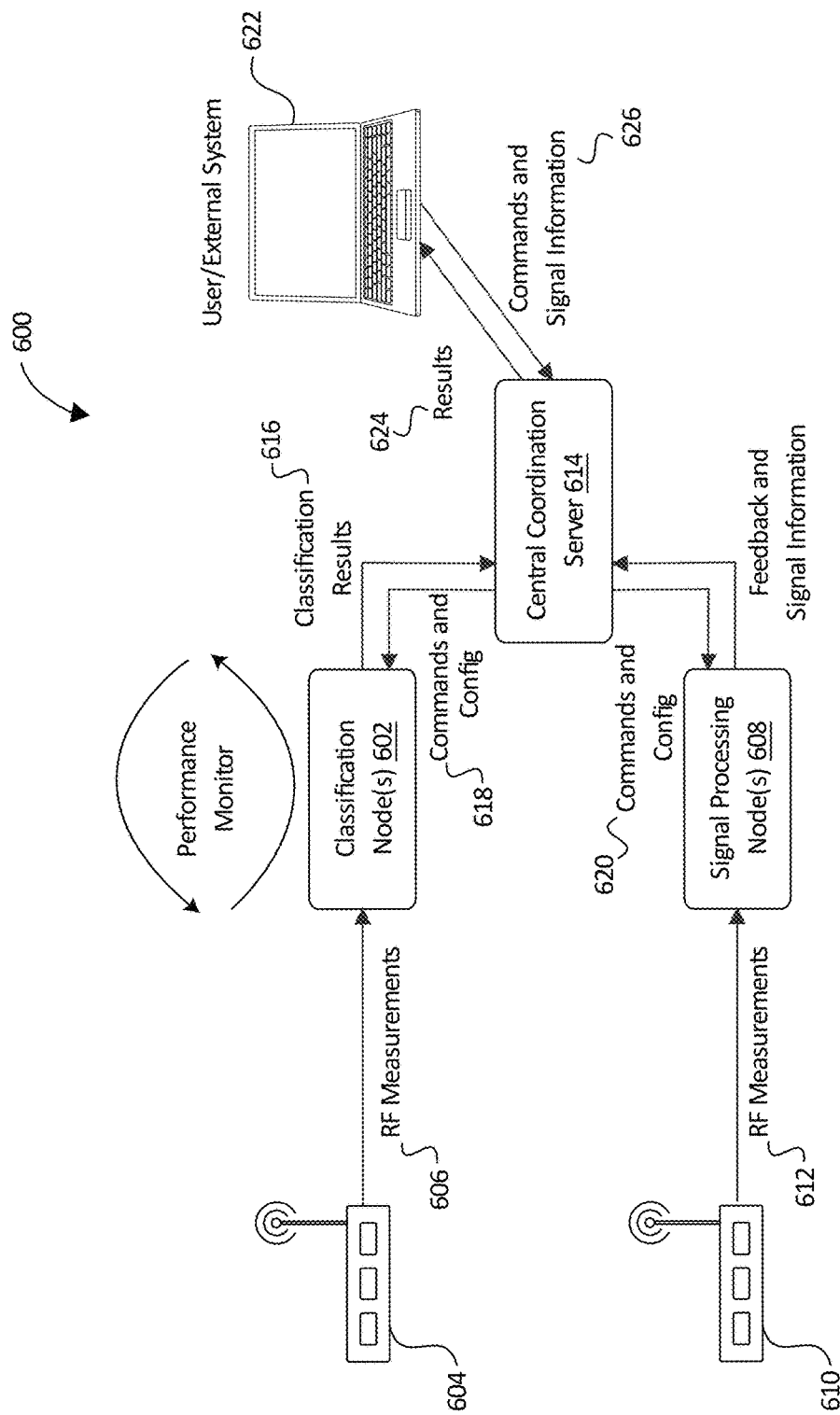
FIG. 6 illustrates a system for real-time spectrum monitoring and analyzing in accordance with one or more embodiments.

System 600 may include a central coordination server 614 operable to communicate with a set of classification nodes 602 and to a set of signal processing nodes 608. Each such set of nodes may be coupled to a respective radio frequency (RF) measurement source/device. In FIG. 6, classification nodes 602 are coupled to RF measurement sources 604, and signal processing nodes 608 are coupled to RF measurement sources 610. In various embodiments, central coordination server 614 may operate as a coordination server that coordinates classification nodes 602 and signal processing nodes 608. Classification nodes 602 and signal processing nodes 608 may be configured to communicate with central coordination server 614 over a variety of wired and unwired communication paths, and combinations thereof, chosen based an application. In some embodiments, central coordination server 614 may be a computer system or distributed computer system configured for performing functions or parts of functions of central coordination server 614 described herein, and more specifically may include core logic, user/system interfaces, sub-controllers for generating and sending commands to signal processing nodes 608 and classification nodes 602 (i.e., signal processing node controllers and classification node controllers), classification results processors, and a node database. Central coordination server 614 may be coupled to or communicate with user/external system 622, which send commands and signal information 626 to central coordination server 614 related to performing spectrum monitoring and analysis, and receive results 624 of such monitoring and analysis from central coordination server 614.

RF measurement sources 604 and RF measurement sources 610 are radio devices configured to sample RF signals in a wireless environment and provide the sampled RF signals (RF measurements 606 and RF measurements 612, respectively) to classification nodes 602 and signal processing nodes 608, respectively. In one embodiment, RF measurement sources 604 and RF measurement sources 610 may include one or more software defined radios (SDRs). As non-limiting examples, functional modules of such SDRs may be implemented in software, hardware, an embedded system, and combinations thereof. By way of non-limiting example, such SDR software may be based on GNU Radio, GNU Radio Companion, and GNU Radio Blocks. By way of non-limiting example, hardware implementations of such SDRs may be based on USRP B210, X310, or HackRF One.

Classification nodes 602 are configured to receive RF measurements 606 from RF measurement sources 604 and perform wireless signal classification and provide classification results 616 to central coordination server 614. Notably, classification nodes such as classification nodes 602 may be physically located with RF measurement sources 604 or may be located remote from RF measurement sources 604. When RF measurement sources 604 and classification nodes 602 are physically located together, as non-limiting examples, they may be incorporated as hardware and/or software modules of a single computer system, or RF measurement sources 604 and classification nodes 602 may be separate computer systems coupled together by a wired communication link. When RF measurement sources 604 and classification nodes 602 are not physically located together, as non-limiting examples, RF measurements 606 may be received by classification nodes 602 over a communication network or from a memory device on which RF measurements 606 are recorded. RF measurements 606 received by classification nodes 602 may be raw samples generated by RF measurement sources 604 but they may also be pre-processed. As a non-limiting example, a data warehousing architecture may be used for the data journey from RF measurements 606 to classification nodes 602, where data is cleansed and reformatted for classification nodes 602.

Classification nodes 602 are configured to operate as wireless signal classifiers as well as operate as a utility performance monitors. In disclosed embodiments, classification engines of respective classification nodes 602 are configured to perform ensemble classification processes (as more fully described herein) on an assigned frequency. Meanwhile, in disclosed embodiments, performance monitor engines of respective classification nodes 602 may be configured to collect system performance data about classification nodes 602 and data about classification processes, and determine whether or not to adjust an amount of processing being performed based on the collected information.

In one embodiment, when a classification node of classification nodes 602 comes online, it may be configured to register with the central coordination server 614 and await commands and config 618 from central coordination server 614. More specifically, the classification node awaits operating frequency information included with commands and config 618 about an assigned frequency, from central coordination server 614.

Respective signal processing nodes 608 may be configured for a variety of signal processing features and functions, which may overlap or be different than signal processing functions of other signal processing nodes 608. As non-limiting examples, such functions may include recording wireless signals of one or more wireless signal classes, demodulating a wireless signal of a wireless signal class, reverse engineering a protocol of a wireless signal, and localization of a wireless signal. Respective signal processing nodes 608 may include specialized hardware and software for performing such functions. As a non-limiting example, a node of signal processing nodes 608 that specializes in recording a wireless signal may include an RF measurement sources 610 having an SDR for a specific RF band and a memory architecture for recording the wireless signal. By way of another non-limiting example, a node of signal processing nodes 608 that specialize in demodulation of signals and data packet capture may include demodulation software, including software for demodulating specific wireless signal classes 718 (see FIG. 7).

In one embodiment, when respective signal processing nodes 608 come online, they register with central coordination server 614. The registration requests sent by signal processing nodes 608 include information about the capabilities of respective signal processing nodes 608. Respective signal processing nodes 608 may have different capabilities (i.e., be configured to perform different functions) and may or may not be located in different geographic locations. Once registration is complete, a node awaits commands and config 620 from central coordination server 614. In disclosed embodiments, central coordination server 614 may direct respective signal processing nodes 608 to perform additional processing on a signal, based on a node's capabilities.

Figure 7:
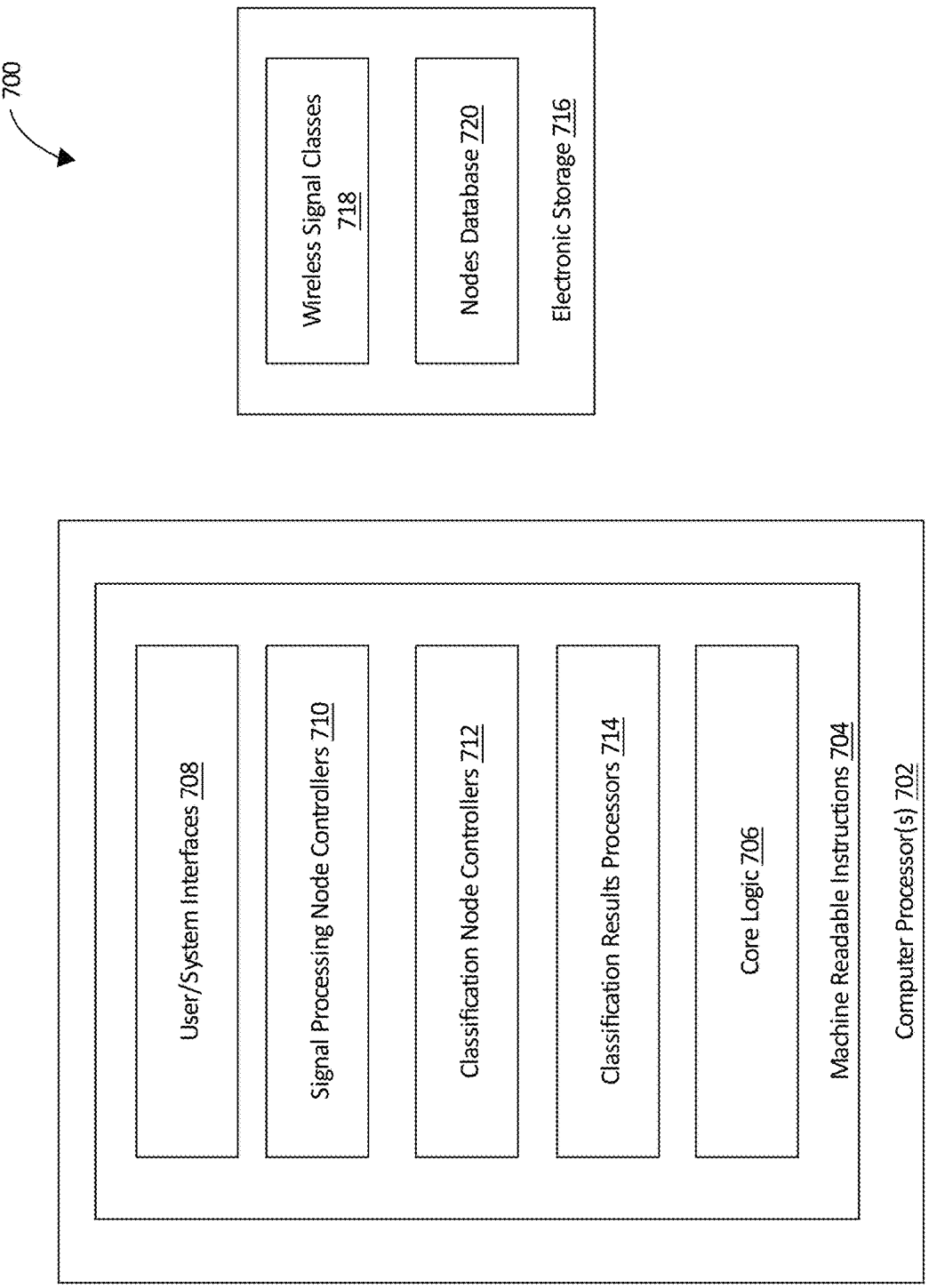
FIG. 7 illustrates a central coordination server in accordance with one or more embodiments.

FIG. 7 shows a simplified block diagram of a central coordination server 700, operable, for example, as a central coordination server 614 of FIG. 6. Central coordination server 700 may include electronic storage 716, one or more computer processors 702, and/or other components (e.g., input/output devices, display devices, networking equipment, without limitation).

Central coordination server 700 may include one or more engines for performing various functions of central coordination server 700 described herein. In the embodiment shown in FIG. 7, engines are shown as computer machine readable instructions 704, however, it should be appreciated that these modules may be implemented in analog circuits or digital circuits, and combinations thereof. Shown in FIG. 7 are engines for core logic 706, user/system interfaces 708, signal processing node controllers 710, classification node controllers 712, and classification results processors 714. Central coordination server 700 may also include electronic storage 716 (i.e., a non-transitory computer readable storage medium) configured to store information about wireless signal classes 718 and nodes database 720.

Core logic 706 is configured to tie the other parts of the central coordination server 700 together. User/system interfaces 708 are configured to enable interaction between central coordination server 700 and a user or broader system. Classification results processors 714 are configured to process results sent to the controller by classification nodes. Nodes database 720 is configured to store information about signal processing and classification nodes that are registered with the system, including locating information (e.g., internet protocol (IP) address, without limitation) and capabilities.

Signal processing node controllers 710 and classification node controllers 712 are configured to handle interactions between the central coordination server 700 and signal processing nodes 608 and classification nodes 602, respectively. As non-limiting examples, interactions may include tasks such as registration, registration, and starting nodes to carry out various operations.

Figure 8:
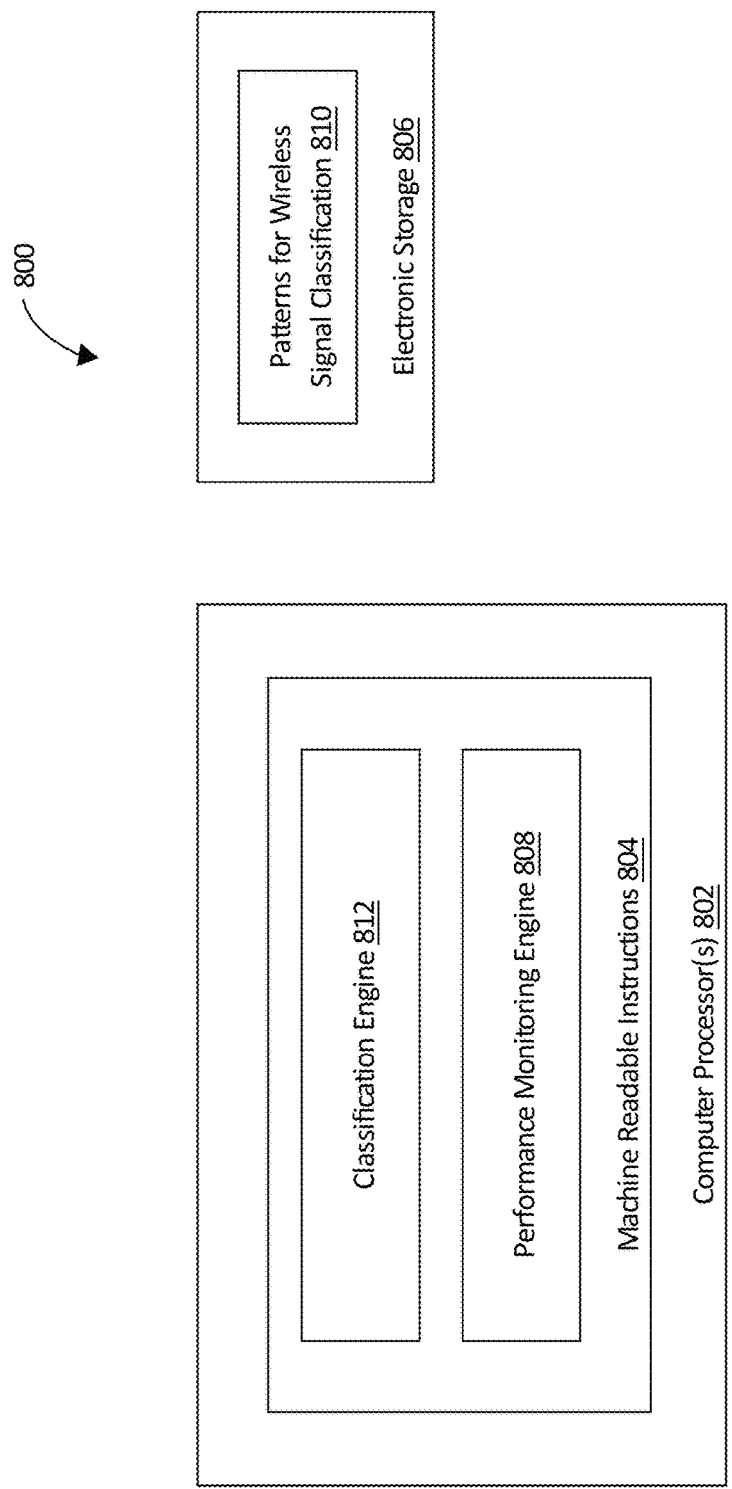
FIG. 8 illustrates a classification node in accordance with one or more embodiments.

FIG. 8 shows a simplified block diagram of an embodiment of a classification node 800 operable as one or more of the classification nodes 602 of FIG. 1.

In the embodiment shown in FIG. 1, classification node 800 is implemented in a computer. Machine readable instructions 804 for various modules for signal classification, registration, performance monitoring, and administration of classification node 800 may be executed by computer processors 802. Specifically, machine readable instructions 804 for a classification engine 812 and a performance monitoring engine 808 are shown in FIG. 8.

Classification engine 812 is configured, generally, to perform embodiments of wireless signal classification described herein. Performance monitoring engine 808 is configured, generally, to perform embodiments of performance monitoring described herein. Both classification engine 812 and performance monitoring engine 808 may be configured to use information stored at electronic storage 806. In the embodiment shown in FIG. 8, patterns 810 for wireless signal classification are stored at electronic storage 806 and may be accessed and used by classification engine 812 to perform embodiments of wireless signal classification techniques described herein.

Some embodiments of the disclosure relate, generally, to a wireless signal classification scheme that may be used for spectrum monitoring and analyzing and incorporated into systems such as the spectrum monitoring and analyzing system described above. In one embodiment of the classification scheme, an efficient (in terms of computation resources) classification technique is run continuously, and one or more compute-intensive, but more accurate, classification technique(s) run occasionally. Classification result(s) are based on weighted combination of the individual results of the efficient and compute-intensive techniques. In one embodiment, the compute-intensive classification technique is a machine-learning-based technique that uses a supervised or unsupervised algorithm. In one embodiment, the machine-learning based technique is a single and/or multi-class SVM (support vector machine). In one embodiment the efficient classification technique is an energy-based classification technique.

Figure 9:
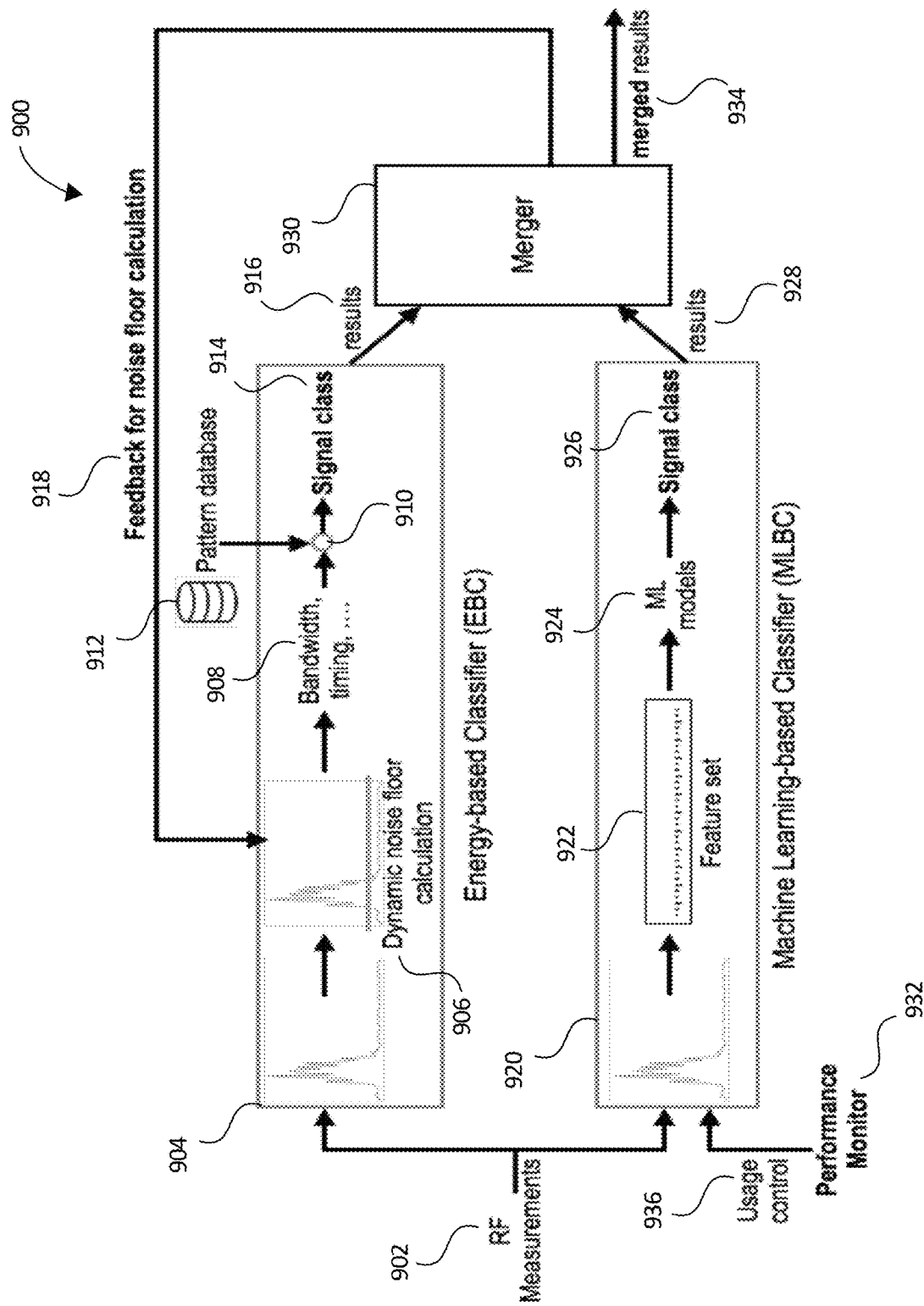
FIG. 9 illustrates a system for performing wireless signal classification in accordance with one or more embodiments.

FIG. 9 shows a functional block diagram of a system 900 for performing wireless signal classification, in accordance with disclosed embodiments. In the embodiment shown in FIG. 9, system 900 includes engines for energy-based classifier (EBC) 904, machine learning-based classifier (MLBC) 920, and merger 930.

In block 906, energy-based classifier (EBC) 904 performs dynamic floor cutoff calculations using input RF measurements 902. In block 908, energy-based classifier (EBC) 904 performs bandwidth and timing analysis of the data above the dynamically calculated noise floor cutoff and extracts bandwidth and timing information about the data. Energy-based classifier (EBC) 904 uses the bandwidth and timing information to determine if a warless signal is present or not (i.e., detect a wireless signal) in the RF measurements 902.

If energy-based classifier (EBC) 904 determines a wireless signal is present in the data then, in block 910, energy-based classifier (EBC) 904 performs pattern analysis to determine and assign a signal class 914 to the detected wireless signal based, at least in part, on the bandwidth and timing information extracted from RF measurements 902 and known patterns 912 of signal parameters. Stated another way, energy-based classifier (EBC) 904 is configured to detect that signal class 914 is present in RF measurements 902.

In various embodiments, when performing wireless signal classification, energy-based classifier (EBC) 904 will typically attempt to detect multiple known signal classes in RF measurements 902 using known patterns 912. So, energy-based classifier (EBC) 904 may be understood as implementing multiple signal classification processes, each such classification process configured to detect a different signal class in RF measurements 902. Energy-based classifier (EBC) 904 provides EBC results 916 to merger 930, which includes the signal class 914 assigned to the signal detected in the data and may also include at least some of the timing and bandwidth information for the signal. As non-limiting examples, EBC results 916 may include one or more of signal type, frequencies and frequency bands, scores, and counts for detected signals.

In block 922, machine learning-based classifier (MLBC) 920 computes a feature set for RF measurements 902, and then, in block 924, uses pre-trained machine learning models on the computed feature set to predict whether a signal is present in the RF measurements 902 that belongs to one of the signal classes associated with the ML models. Machine learning-based classifier (MLBC) 920 provides MLBC results 928 to merger 930, which includes the assigned block 926. Notably, MLBC results 928 may include a single assigned class or include a list or curated list of classes that machine learning-based classifier (MLBC) 920 predicts a signal may belong to with a confidence score.

Merger 930 combine EBC results 916 and MLBC results 928 and forwards on the merged results 934 to, e.g., a central coordination server 614 of FIG. 6.

In some embodiments, energy-based classifier (EBC) 904 may be configured to "tune" to a noise level of its surrounding environment, as more fully described later in this disclosure. In the embodiment shown in FIG. 9, merger 930 sends feedback 918 about merged results 934 to energy-based classifier (EBC) 904. Energy-based classifier (EBC) 904 is configured to use feedback 918 to improve its dynamic noise floor calculation at block 906, which in turn improves the capability of energy-based classifier (EBC) 904 to dynamically track and adapt to noise levels of a surrounding environment, and improves its classification performance more generally.

In some embodiments, system 900 may be configured to control usage of machine learning-based classifier (MLBC) 920 in order to meet real-time performance requirements. In one embodiment, performance monitor 932 is configured to send adjustment commands 936 to machine learning-based classifier (MLBC) 920 to control a frequency of usage of machine learning-based classifier (MLBC) 920. Performance monitor 932 may be configured to choose and send adjustment commands 936 based on real-time performance requirements of classification engine 312 as more fully described later in this disclosure. Notably, taking into account real-time performance requirements enables system 900 to adapt to available computer resources and hardware configurations without necessarily modifying the computer's operating system or hardware configuration.

Figure 10:
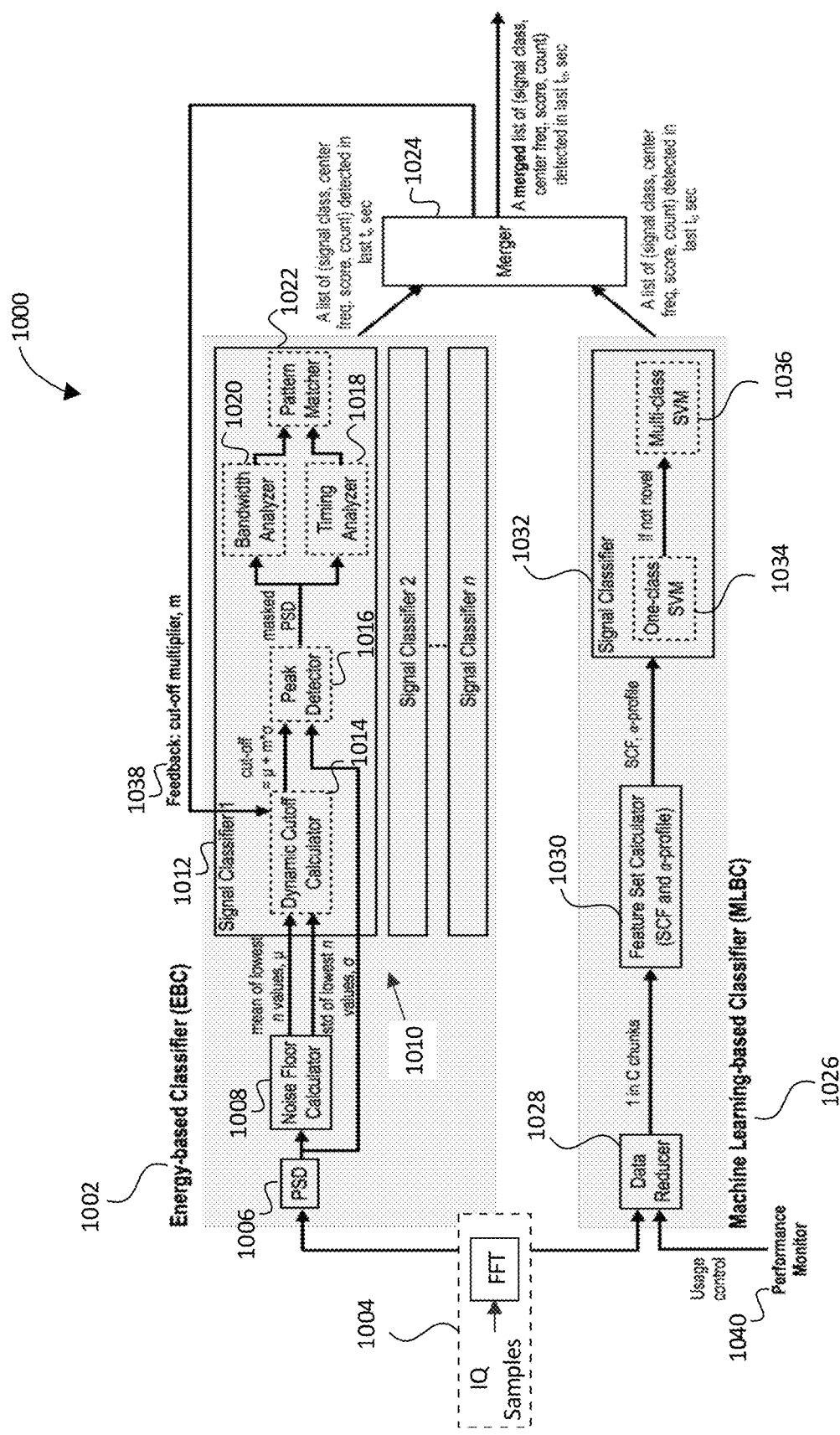
FIG. 10 illustrates a classification architecture for performing wireless signal classification in accordance with one or more embodiments.

FIG. 10 is a simplified block diagram of a system 1000, which is an embodiment of classification architecture for performing wireless signal classification shown in FIG. 9.

In the embodiment shown in FIG. 10, EBC 1002 includes a Power Spectral Density (PSD) calculator, PSD 1006, a noise floor calculator 1008, and signal classifiers 1010. Respective signal classifiers 1010 may include a dynamic cutoff calculator, a peak detector, a bandwidth and/or timing analyzer, and a pattern matcher, although only signal classifier 1012 is shown in detail in FIG. 10. PSD 1006, noise floor calculator 1008, and dynamic cutoff calculator 1014 are configured to dynamically compute a noise floor cutoff used for energy-based classification. In some embodiments, the computation of the noise floor cutoff changes over time based on feedback 1038 from merger 1024, which enables EBC 1002 to tune to the noise level of the environment in which it is deployed.

In the embodiment shown in FIG. 10, RF measurements 1004 are samples of quadrature signals commonly referred to as "IQ samples," for which a fast-Fourier transform has been computed. Pattern matcher 1022 is configured to receive the features and make a final classification (i.e., output a result that indicates whether the signal class of signal classifier 1012 was detected in RF measurements 1004) based on the received features.

Peak detector 1016, bandwidth analyzer 1020, and timing analyzer 1018 are configured to extract features used for energy-based classification from RF measurements 1004. Peak detector 1016 is configured, generally, to identify signal peaks that standout from the general noise level, and so may indicate a signal. Bandwidth analyzer 1020 is configured, generally, to compute set of contiguous bins from the FFTs that are above the calculated noise floor cutoff using the information received from PSD 1006. For every set of inputs bandwidth analyzer 1020 receives, it is configured to search for contiguous sets of bins that are above the threshold (i.e., the calculated noise floor cutoff).

Timing analyzer 1018 is configured, generally, to track active and inactive intervals for each bin computed by bandwidth analyzer 1020. In one embodiment, timing analyzer 1018 is configured to consider a bin active if it was considered part of a signal by peak detector 1016 and configured to consider a bin inactive if not considered active. Timing analyzer 1018 sends information about the amount of time bins were active and inactive (after a state change) to pattern matcher 1022. In one embodiment, timing analyzer 1018 has a two-state state machine that it maintains for every entry in the information it receives from the peak detector 1016.

In disclosed embodiments, pattern matcher 1022 may be configured to determine if a particular signal (i.e., a signal corresponding to a known signal class) is present or not in RF measurements 1004 by comparing the received bandwidth and/or timing results received from bandwidth analyzer 1020 and timing analyzer 1018, respectively, against a known set of parameters for a known signal class. As a non-limiting example, an IEEE 802.11g signal using orthogonal frequency-division multiplexing (OFDM) uses approximately 16.6 MHz of spectrum, so a pattern is matched against RF bands found by bandwidth analyzer 1020 to be present in RF measurements 1004. Similarly, timing patterns such as Short Interframe Spacing (SIFS) inactive intervals and active transmission times required for packets based on various data rates are compared against inactive and active timing information found by timing analyzer 1018. As another non-limiting example, a ZIGBEE® pattern matcher takes just the RF bands found by bandwidth analyzer 1020 and compares it to the expected 2 MHz of spectrum occupancy for ZIGBEE®.

In one embodiment, upon detecting a match, pattern matcher 1022 is configured to compute a classification score of a classification for a band (s,f). In one embodiment, a classification score may be calculated using Equation 1, described above.

Results may be stored for a set time period, to, before being sent to merger 1024.

Turning to MLBC 1026, in the embodiment shown in FIG. 10, MLBC 1026 includes data reducer 1028, feature set calculator 1030, and signal classifier 1032.

MLBC 1026 is configured to receive usage adjustment commands from performance monitor 1040, and to change the frequency with which MLBC 1026 is turned on for classification. Data reducer 1028 is configured to form C chunks of data, where respective chunks have enough contiguous samples to calculate one feature set needed for machine learning models. In one embodiment, only one chunk is forwarded to feature set calculator 1030 and the other chunks are discarded. As non-limiting examples, algorithms used to select the forwarded chunk may include select the first chunk, select chunk$_N$ each time, randomly select a chunk. An algorithm that uses random selection may be selected if missed detection of signals that are being transmitted during off-period of MLBC is a concern. The frequency at which data is chunked or chunks are forwarded will affect the frequency at which MLBC 1026 performs wireless signal classification.

Feature set calculator 1030 is configured to determine a feature set using forwarded chunks of data (i.e., chunks of RF measurements 1004) from data reducer 1028. Feature set calculator 1030 sends the determined feature set to signal classifier 1032 for pattern matching.

Some disclosed embodiments relate, generally, to classifying a known signal in different operating frequencies than the signals used to train a classifier. By way of explanation and not limitation, classifiers may be trained using signals present in specific parts of a frequency spectrum, but generally speaking, signals of that type may be present in other parts of a frequency spectrum. For example, signals of the same class may be present in different channels and so appear in different parts of a frequency spectrum. So, signals of the same class that appear in different parts of a frequency spectrum are typically clustered (i.e., grouped) together in signal clusters. In some embodiments, a "shift-invariant feature representation"—i.e., a feature representation of a feature insensitive to shifts along the frequency axis—is used for known and unknown signals. In one embodiment, an alpha-profile is used as a shift-invariant feature representation.

Notably, in disclosed embodiments that use shift invariant feature representation, signals of a class are not identified as "unknown signals" (e.g., by signal classifier 1032) simply because the signals are present in a different part of a frequency spectrum than the signals used to train a signal classifier 1032. So, in the case of hardware or implementation changes within a wireless environment, simply changing a channel used by a Wi-Fi modem or BLUETOOTH® device would not necessarily result in a new signal classifier unless a shift-invariant feature representation changes.

In the embodiment shown in FIG. 10, cyclostationary characteristics of signals are used for shift-invariant feature representation. Feature set calculator 1030 computes a Spectral Correlation Function (SCF) to capture cyclostationary characteristics using a time smoothing method, as set forth in Equation 3, described above.

Feature set calculator 1030 next computes an α-profile from the SCF, as set forth in Equation 4, described above.

The α-profiles of different signals show spikes at different α related to the periodicity of the corresponding signal. Besides, α-profile is invariant to center frequency offset. Therefore, using α-profile, machine learning models may be trained without using data corresponding to all possible center frequency offsets.

As a non-limiting example, shift-invariant feature sets may include one or more, cyclostationary features. Notably, data reducer 1028 and performance monitor 1040 may be configured to automatically handle changes in frequency of MLBC 1026 usage in order to incorporate different types of feature set computation and machine learning models.

Signal classifier 1032 is configured to use pre-trained machine learning models with the input feature sets for signal class prediction. In the embodiment shown in FIG. 10, signal classifier 1032 includes a one-class SVM 1034 and a multi-class SVM 1036. One-class SVM 1034 is configured as a novel signal detector, that is, to detect that an alpha-profile provided by feature set calculator 1030 is associated with an unsupported signal class (i.e., a signal that is novel to signal classifier 1032). Using a one-class SVM model reduces the chances of noise or unsupported signal types being classified as one of the supported signal classes.

If one-class SVM 1034 predicts that the α-profile is not novel (i.e., belongs to one of the supported signal classes) then signal classifier 1032 runs a pre-trained multi-class SVM 1036 to determine the signal class. Multi-class SVM 1036 also provides a prediction of the signal class, which is saved as a score value for a detected signal. Signal classifier 1032 computes the center frequency of the detected signal using the other column of the input SCF, which contains the magnitudes of the input FFT's averaging over L FFTs. In one embodiment, the center frequency computation may be performed by finding the center of the bin values of width equal to the bandwidth of the detected signal class that have maximum sum. Signal classifier 1032 stores result for a set period of time $t_0$ and after $t_0$ it forwards the stored results to merger 1024.

Each of EBC 1002 and MLBC 1026 may be configured to maintain a list of detected signal classes (s), corresponding center frequency (f), the number of times a signal s at f has been detected (count), the classification score for detected s, f (score) over an update period, $t_o$. The score values will typically be in the range of (0.0, 1.0], where a values of about 0.0 means very little confidence in a classification, a value of about 1.0 mean very high confidence in a classification, with a sliding scale for values between 0.0 to 1.0.

At each update period to, both EBC and MLBC send a list of s, f, count, score to merger 1024. Merger 1024 tracks the received results from both classifiers and updates score and count values if results for the same s, f, are received from the same classifier. As a non-limiting example, merger 1024 may update score and count values using Equation 5 and Equation 6, set forth below:

$$\text{new } score_{s,f} = \frac{e\_count_{s,f} * score_{s,f} + count_{s,f} * score_{s,f}}{e\_count_{s,f} + count_{s,f}} \quad \text{Equation 5}$$

$$\text{new } count_{s,f} = e\_count_{s,f} + count_{s,f} \quad \text{Equation 6}$$

In Equations 5 and 6, $e\_count_{s,f}$ and $e\_score_{s,f}$ are current count and score values for s,f. $Count_{s,f}$ and $score_{s,f}$ are 0 if no previous results are available. If a new entry does not match an existing entry in terms of center frequency, the new entry is simply added to the set of existing entries.

At each time period, $t_m$, merger 1024 is configured to combine the results from both classifiers and computes a merged_$score_{s,f}$ for all the s,f in the results. As a non-limiting example, merger 1024 may calculated a merged score using Equation 7, set forth below:

$$\text{merged } score_{s,f} = \frac{\omega \mid E^* score_{s,f,E} + \omega_M^* score_{s,f,M}}{\# \text{ of classifiers that reported for } s} \quad \text{Equation 7}$$

In Equation 7, $w_E$ and $w_M$ are pre-defined weights for the classifiers, $score_{s,f,E}$ and $score_{s,f,M}$ are the score values for s, f, from the results sent from the EBC and MLBC respectively. If a particular s, f is not reported by a classifier, the corresponding score ($score_{s,f,E}$ or $score_{s,f,M}$) is set to zero.

During the merging process performed by merger 1024, signals that are detected by both of EBC 1002 and MLBC 1026 will typically have a higher merged score than signals reported by only one classifier. Notably, in some cases EBC 1002 and MLBC 1026 may agree on actual signals but disagree on false positives, which helps the overall classification engine discard false positives.

One challenge in performing an energy-based classification approach is determining a noise floor of a received signal and a noise floor cutoff based on that noise floor, i.e., determining which part of the received signal to consider as an actual "signal" versus background noise.

Some embodiments of the disclosure relate, generally, to a noise-adaptive monitoring and analysis system that automatically adapts to available computational resources and a surrounding noise level. The classification technique is adapted to the noise level of a surrounding environment. Embodiments that implement one or more noise-adaptive features may be deployed in different kinds of environments such as indoor, dense urban, etc., without requiring any manual configuration or changes in the classification process. One embodiment of a noise-adaptive monitoring and analysis system includes a feedback mechanism from the merged result to the compute-intensive classification process (e.g., an energy-based classification process) to aid its dynamic floor calculation and improve its accuracy.

In some embodiments, EBC 1002, is configured to compute a noise floor from a lowest n power values provided by PSD 1006. As a non-limiting example, noise floor cutoff may be calculated using Equation 8:

$$\text{noise floor cutoff} = \mu + m^* \sigma \quad \text{Equation 8}$$

In Equation 8, (μ) and (σ) are mean and standard deviation, respectively, of the lowest n power values provided by PSD 1006, respectively, and m is a multiplier. A higher value of m will result in a higher cutoff value. By calculating a noise floor cutoff for each PSD 1006 over time, the cutoff changes dynamically as changes (i.e., increases/decreases in the amount of background noise) occur in the deployed environment.

Merger 1024 provides feedback 1038 to dynamic cutoff calculator 1014 in order to dynamically adjust the multiplier value m over time. In one embodiment, feedback 1038 is a linear function square-of-differences in the number of results, (NE) and (NM), reported from EBC 1002 and MLBC 1026, respectively. Notably, if MLBC 1026 reports more signals than EBC 1002, then EBC 1002 is likely using a higher noise floor cutoff value thus missing parts of the signal to be detected. In some embodiments, merger 1024 may be configured to send a command to EBC 1002 to use a lower value for m. Likewise, in a case when MLBC 1026 reports more signals than EBC 1002, merger 1024 may be configured to instruct EBC 1002 to use a higher value for m.

Among other advantages, it should be appreciated that feedback 1038 improves the capability of system 1000 to adapt to its environment at run time and be less susceptible to bad initialization parameters.

Determining the amount of processing (i.e., amount of processing of RF measurements) that can be dedicated to a machine learning-based classifier is a challenge. More processing by MLBC 1026 will improve classification results of system 1000 quicker in a variety of environments, for example, if transient signals are involved. The amount of available resources on a classification node will vary, for example, due to other processes on the computer system starting or stopping, changes in processing required by other processes, without limitation.

Some embodiments of the disclosure relate, generally, to an auto-tunable monitoring and analysis system. In one embodiment, the frequency of the usage of the compute-intensive classification technique(s) is automatically adjusted based on the available system resources (e.g., automatically tuned). In one embodiment, a performance monitor (e.g., a software application) is configured to gather information from an operating system and a classifier/classification engine. As non-limiting examples, information gathered from the operating system may include a current processing load and a current network buffer allocation for sockets associated with a process (e.g., a machine learning based classification process). The performance monitor may obtain information from the classifier both actively, such as requesting a process's identifier (ID) and its current settings, and passively by monitoring output coming from the process.

In one embodiment, a performance monitor is configured to use a combination of reactive and proactive techniques to make adjustments to processing load. By way of example, adjustments may be made due to poor throughput (e.g., not processing samples quickly enough). Moreover, the performance monitor may be configured to predict when packets will drop in the future, for example, by monitoring network buffer usage information. The performance of the reactive and proactive techniques may be continuously improved/customized through machine-learning. For example, in the case of poor throughput, the performance monitor may be configured to decrease the number of samples sent to a machine learning-based classifier responsive to network buffer usage. Machine learning may be used to tune the response based on buffer size to account for differences in buffer sizes between machines and changes to buffer size in a machine over time.

Figure 11:
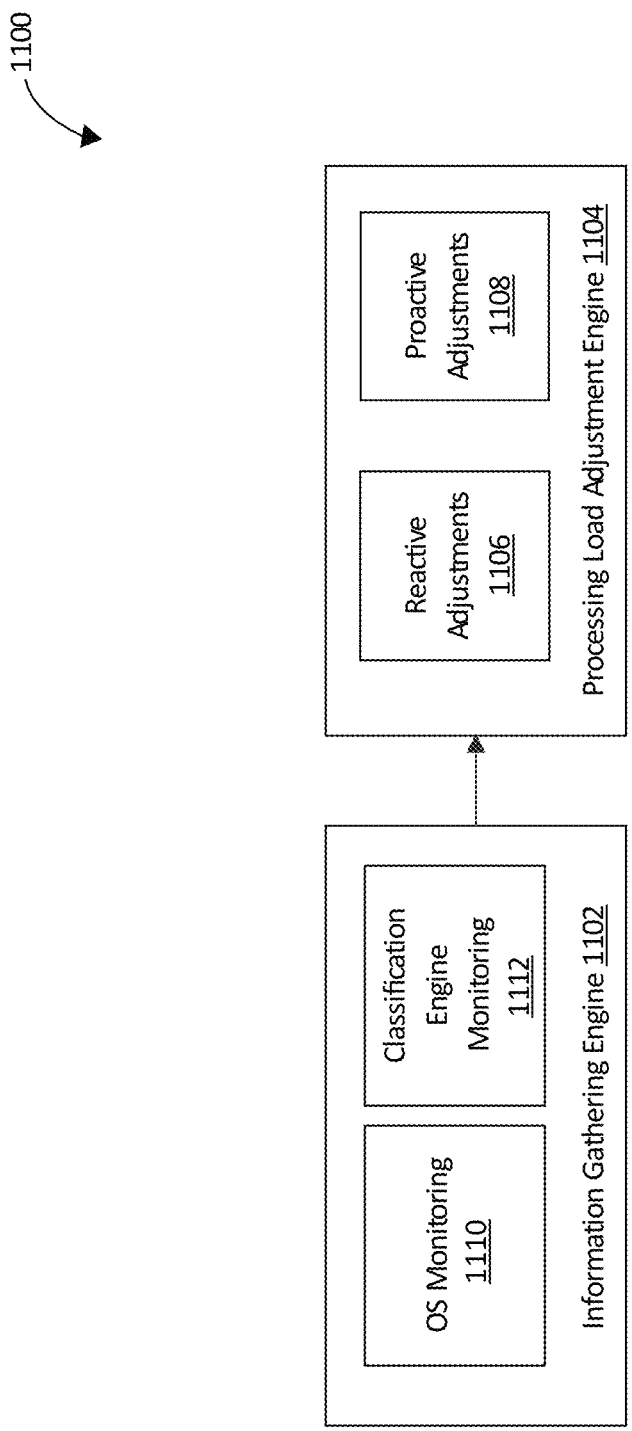
FIG. 11 illustrates a performance monitoring engine in accordance with one or more embodiments.

FIG. 11 shows block diagram of a performance monitoring engine 1100, in accordance with disclosed embodiments.

Information gathering engine 1102 is configured, generally, to gather information about the performance of a machine learning-based classification process (i.e., monitor the process). As non-limiting examples, information may be gathered from an operating system and/or a classification engine. Information gathered from the operating system may include, as non-limiting examples, the current processing load and the current network buffer allocation for the sockets associated with a process. Information from the classification engine may be obtained both actively, such as requesting the process' ID and its current settings, and passively by monitoring output coming from the process.

Processing load adjustment engine 1104 may be configured to use a combination of reactive and proactive approaches to make adjustments in processing load. In one embodiment, reactive adjustments 1106 is configured to detect that samples are not being processed fast enough and propose that the performance monitoring engine 1100 decrease the amount of samples sent to the machine learning-based classifier. As a non-limiting example, Classification Engine Monitoring 1112 may report that an overflow occurred or packets were dropped at the classification engine. Reactive adjustments 1106 interprets the report to mean that samples are not being processed quick enough and respond by decreasing the amount of samples sent to the machine learning classifier. As non-limiting examples of an adjustment parameter may include number of samples of a group and group size (i.e., number of samples in a group). Moreover, proactive adjustments 1108 also receives the report from Classification Engine Monitoring 1112 and updates historical data and modeled packet drop behavior. Proactive adjustments 1108 predicts dropped packets based on its modeled packet drop behavior as well as network buffer usage information sent by OS monitoring 1110 for sockets associated with data transfer.

Figure 12:
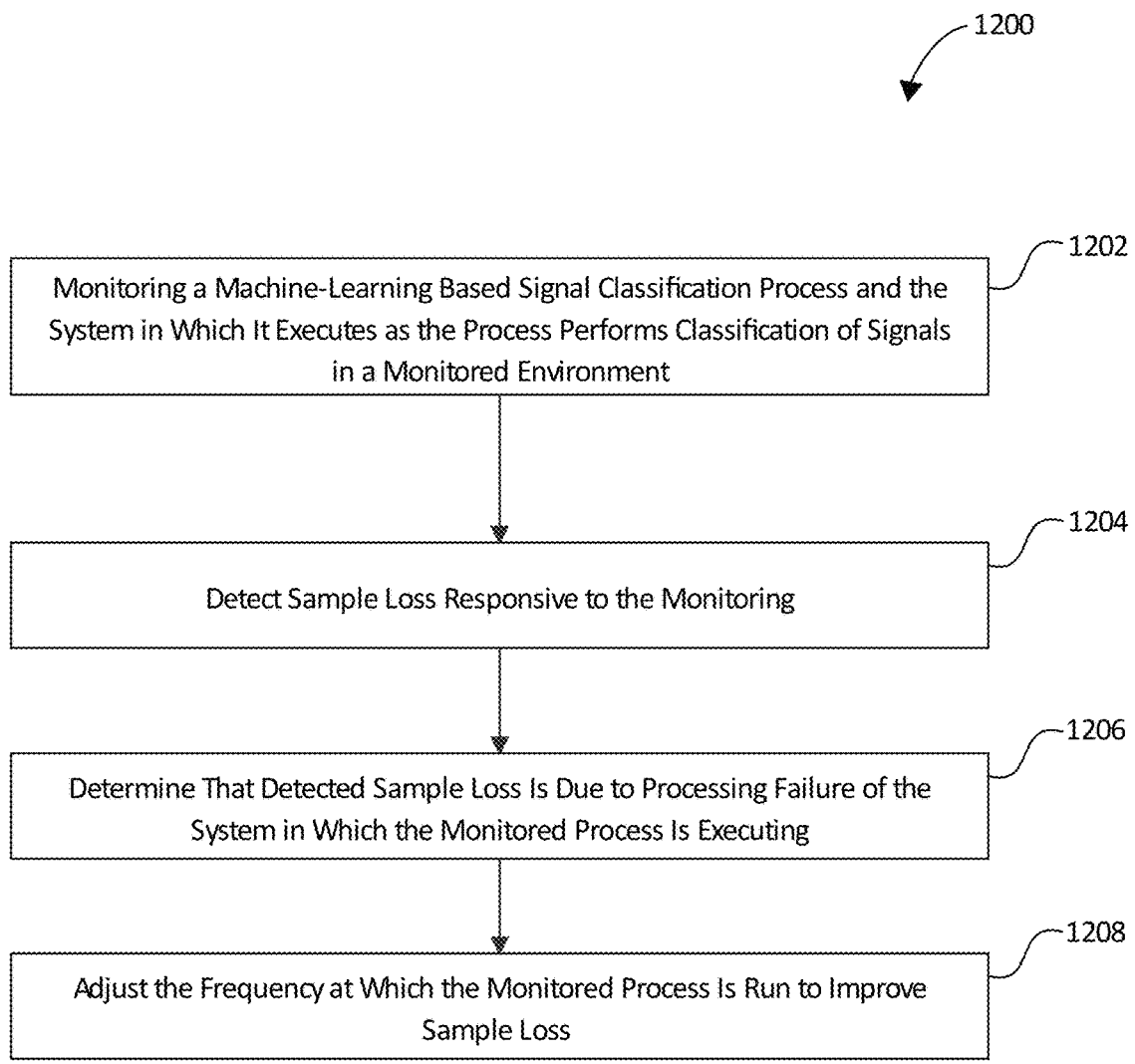
FIG. 12 illustrates a performance monitoring and load adjustment process in accordance with one or more embodiments.

FIG. 12 shows a flowchart for a performance monitoring and load adjustment process 1200, in accordance with disclosed embodiments.

In operation 1202, a machine learning-based signal classification process (e.g., MLBC 1026) and the computing system in which it executes is monitored as the process performs classification of signals in a monitored wireless environment. In one embodiment, monitoring includes receiving information from the operating system of the computer system and the classification engine itself. In one embodiment, received information form the operating system may include information about a current processing load and/or a network buffer allocation. In one embodiment, monitoring the classification engine may involve both active monitoring and passive monitoring. In one embodiment, active monitoring involves requesting information about the process identifiers and configuration/settings of the process. In one embodiment passive monitoring involves inputs and/or outputs of a classification process.

In operation 1204, sample loss is detected and/or predicted responsive to the monitoring in operation 1202. In one embodiment, sample loss may be detected responsive to current sample loss and/or predicted sample loss. In one embodiment, predicted sample loss may be detected based on one or more trained models of sample loss behavior of the system and/or classification process. In one embodiment, a model of sample loss behavior may be a model of packet drop behavior by the system in which the monitored machine learning-based classification process is executing.

In operation block 1206, it is determined the sample loss (actual or predicted) is or will be due to a processing failure of the system in which the monitored process is executing. In one embodiment, a processing failure may be determined because the classification process cannot (or will not be able to) keep up with the rate at which samples are being sent to it. As non-limiting examples, processing rate failure may be determined because it is determined that the system is processing samples slower than the rate at which samples are arriving for classification (e.g., buffer overrun), or because a network socket cannot keep up with the rate at which packets arrive.

In operation 1208, the frequency at which the monitored process is requested to classify samples is adjusted to improve the detected sample loss. In one embodiment, frequency adjustment may occur at system 1000 by configuring data reducer 1028. In another embodiment, frequency adjustment may occur at an RF measurement device such as RF measurement sources 104 (i.e., adjusting the rate at which samples are taken and sent to classification nodes).

Some embodiments relate, generally, to incrementally building learned models about unknown signals and deploying classifiers (i.e., known wireless signal classifiers) that use the learned models (or are the learned models) to classify signals. An aspect of such embodiments is that new wireless signal classifiers may be built (i.e., created in software) and deployed in a monitoring system "on-the-fly" or automatically. Another aspect of such embodiments is that classes may be chosen for an application of a monitoring system, and then when a monitoring system is deployed, it may be "tuned" to the wireless environment by adding new classifiers over time. Yet another aspect of such embodiments is that the number of false positives and false negatives may be reduced over time—or conversely, accuracy of a deployed monitoring system may improve over time. Another aspect of such embodiments is that as hardware changes or implementation changes occur within a wireless environment, monitoring systems of the present disclosure adapt to those changes. For example, new signals (i.e., new known signal classes) may be identified.

Figure 13:
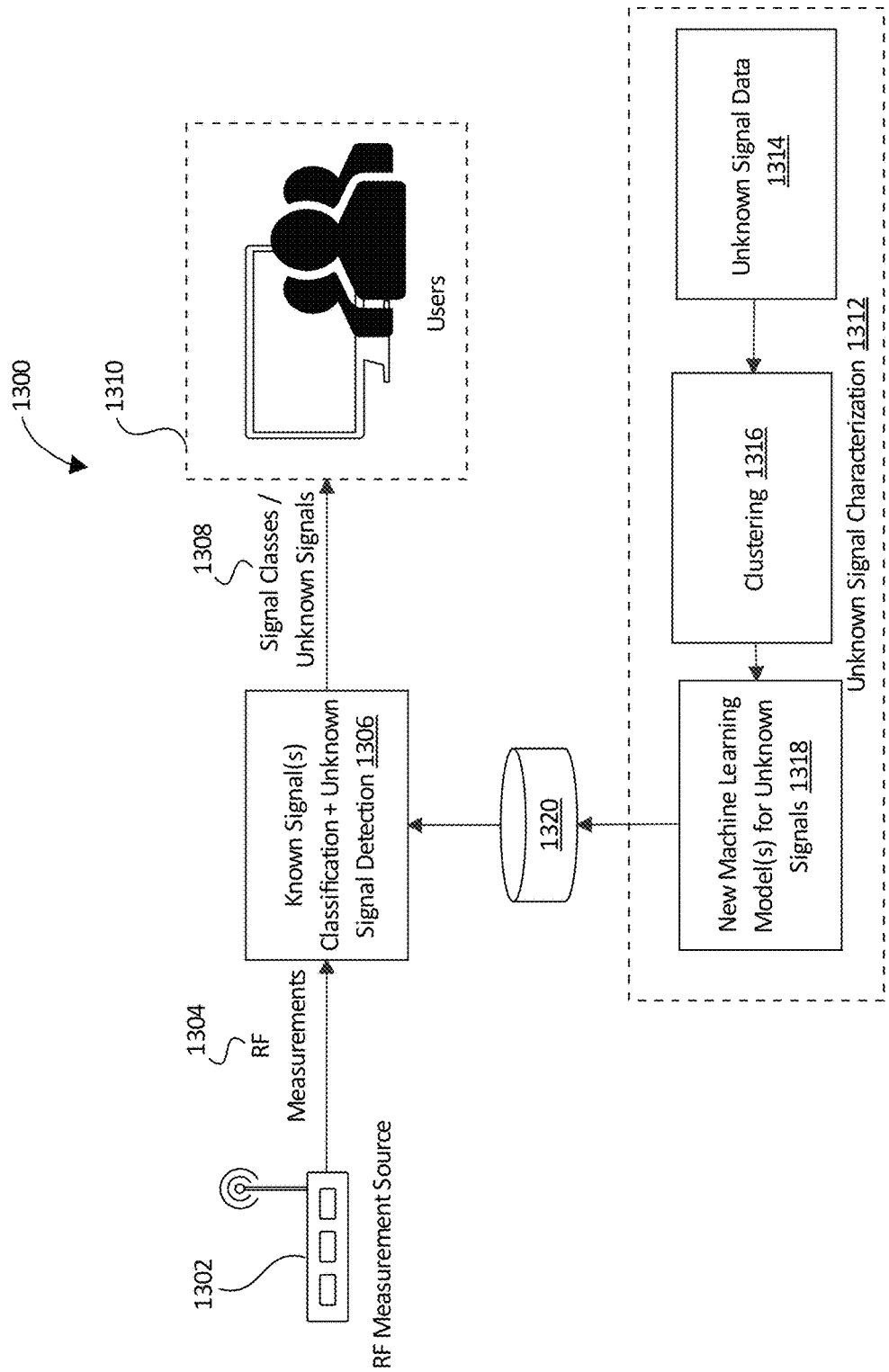
FIG. 13 illustrates a system for performing spectrum monitoring and analysis that incorporates incremental learning about signals in deployed environments, in accordance with one or more embodiments.

FIG. 13 shows a functional block diagram of a system 1300 for performing spectrum monitoring and analysis that incorporates incremental learning about signals in deployed environments, in accordance with disclosed embodiments.

As an initial matter, system 1300 is deployed with a number of pre-trained machine learning models for known signals. The initial set of pre-trained machine learning models at deployment may be chosen, as a non-limiting example, because they are trained to classify signal classes expected to be present in a target environment. Notably, unknown signals may in fact belong to widely used communication signal types, but are unknown as far as system 1300 is concerned if system 1300 does not have a trained model to classify the signal. The terms "known signal" and "supported signal" are used interchangeably in this disclosure, and the terms "unknown signal" and "unsupported signal" are used interchangeably in this disclosure.

At block 1306, known signals are classified and unknown signals detected using RF measurements 1304 from RF measurement source 1302. Results 1308 including known signal classes and unknown signal classes are reported to users 1310. At block 1312, unknown signal characterization is performed on the detected unknown signals from block 1306 using incremental learning techniques to train new classifiers to classify unknown signals.

For the unknown signal characterization process, at block 1314 unknown signal data is received and at block 1316 the data is clustered using clustering techniques (i.e., of the clustering type of unsupervised machine learning techniques) to find groups of unknown signals within the unknown signal data. At block 1318, machine learning-based models for classifying unknown signals are created from the clustered groups of unknown signal data. New machine learning-based models are stored at database of ML models 1320.

Figure 14:
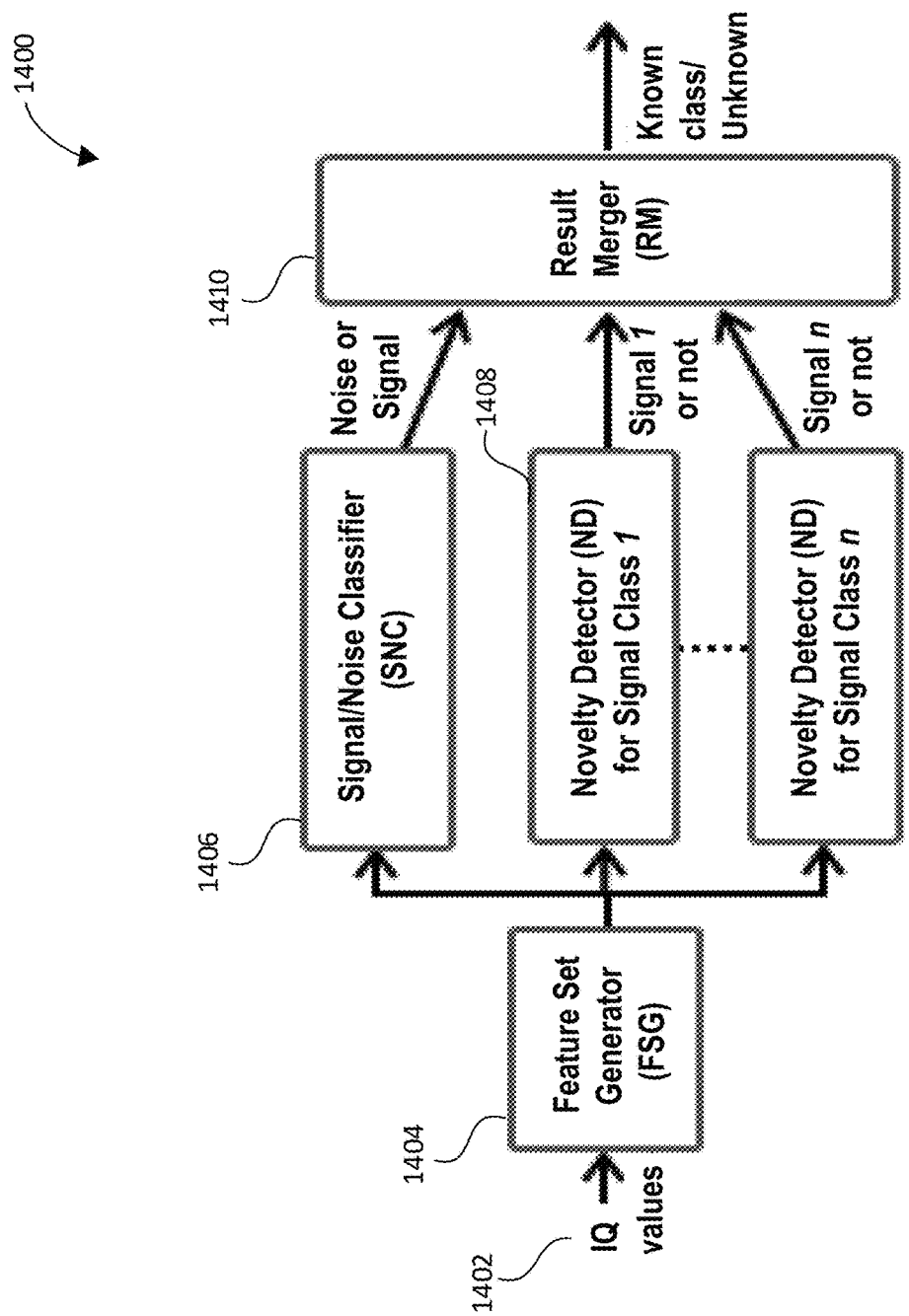
FIG. 14 illustrates a system for performing known and unknown signal detection in accordance with one or more embodiments.

FIG. 14 is a simplified block diagram of a system 1400 for performing known and unknown signal detection in accordance with disclosed embodiments. In the embodiment shown in FIG. 14, a signal/noise classifier 1406 and a series of novelty detectors 1408 are configured to classify signals using measurements 1402 and feature sets generated by feature set generator 1404.

Signal/noise classifier 1406 is configured as a binary classifier trained to classify an input as including a signal or not including a signal, which is interpreted as noise. In one embodiment, signal/noise classifier 1406 is trained on both noise data and signal data. Training on both exploits the distinguishable characteristics of noise vs signal spectrograms (a set of FFTs). In one embodiment, signal/noise classifier 1406 may be a convolutional neural network.

In one embodiment, training and test data for training signal/noise classifier 1406 may be designed so that signal/noise classifier 1406: (a) predicts that signals that are different than its training data are signals; (b) predicts signals shifted in frequency from training data as signals; and (c) predicts low signal-to-noise (SNR) signals are signals. In one embodiment, a training dataset may be created with signal examples having different positions (by shifting the signal data over the frequency axis), widths (by replicating signals multiple times), and signal to noise ratios (SNRs) (by adding noise to the spectrograms). A test dataset may be created with signal data from over-the-air captures that are different in terms of one or more of widths, positions, and SNRs than the training data. The test data may be used to evaluate the generality of different CNN architectures and hyperparameter values.

A series of novelty detectors 1408, one for each known signal class, are also used to classify measurements 1402. Novelty detectors employ novelty detection type machine learning algorithms to determine if input data (RF measurements) belong to a signal class or not. More specifically, novelty detectors 1408 are configured to return a "1" or "true" if measurements 1402 are different (i.e., belong to a different class) than the training data for a signal class.

Results from signal/noise classifier 1406 and novelty detectors 1408 are provided to merger 1410, which is configured to determine a signal type based on the combined results. In one embodiment, merger 1410 gives precedence to the result from signal/noise classifier 1406 over the results from novelty detectors 1408 and identifies a signal type as noise if signal/noise classifier 1406 predicts noise. In another embodiment, merger 1410 may be pre-configured to give precedence to one or more of the respective novelty detectors 1408. As a non-limiting example, if one of the novelty detectors is more efficient at detecting very low SNR signals than signal/noise classifier 1406, merger 1410 is configured to give priority to the result from that novelty detector over the result from the signal/noise classifier 1406. Generally, merger 1410 will label a signal as unknown if all of the novelty detectors predict that it is not in their signal class and signal/noise classifier 1406 predicts a signal. If multiple respective novelty detectors 1408 predict signal then merger 1410 is configured to label the signal as miscellaneous or provide all of the results with a low confidence score.

In one embodiment, autoencoder type neural networks are trained to be the novelty detectors 1408. An autoencoder generates an error signal (called the reconstruction error) that is lower for inputs that belong to the same class as the training data and higher for inputs that do not belong to the same class as the training data. Each autoencoder is trained only on training data from a specific signal class, but test from other signal classes may be used. Each novelty detectors 1408 is configured to compare the error signal to a threshold and if the error signal is above the threshold, returns that the signal is not in its signal class.

In one embodiment, training data for novelty detectors 1408 is created using a feature set comprised of shift-invariant features, that is, features which do not vary based on where on the frequency axis a signal is present (based on the signals center frequency). One aspect of using shift-invariant features is that if a center frequency of a signal is shifted from where is typical for its signal class or just from the center frequency of the training data used for that signal class, a novelty detector can still accurately classify the signal. In one embodiment, m-SCF is used as the shift-invariant feature representation for the autoencoders. In one embodiment, m-SCF may be derived from the Spectral Correlation Function (SCF) by using a time smoothing method to calculate SCF (as described above), and m-SCF is computed from the magnitude of complex SCF. The result of m-SCF is an N-sized array where N is the FFT size being used. The m-SCF of different signals result in different patterns as a specific pattern depends on the signal waveform as well as the bandwidth, but more importantly, the same signals result in the same pattern even if the signals are shift in frequency (i.e., the center frequency is shifted in frequency). As a non-limiting example, ZIGBEE® signals of different channels have substantially similar m-SCF patterns.

The first step towards using autoencoder based novelty detection is to choose the right model parameters for the autoencoder. Recall that an autoencoder is a combination of an encoder and decoder network as described above with reference to system 1400 of FIG. 14. Different hyperparameters may be chosen (e.g., number of epochs, batch size, the values of nx, i.e., the number of nodes in layer x) as well as the network architecture (number of encoder/decoder layers). In order to choose the "best" values, a performance metric may be used. To this end, a cross-validation approach may be used that is described below. Under this metric, it may be observed that choosing networks where an encoder and decoder have a same architecture (but in reverse) in some embodiments, works well. It may also be observed that having layers with increasing number of nodes performs better than decreasing numbers of nodes.

Figure 15:
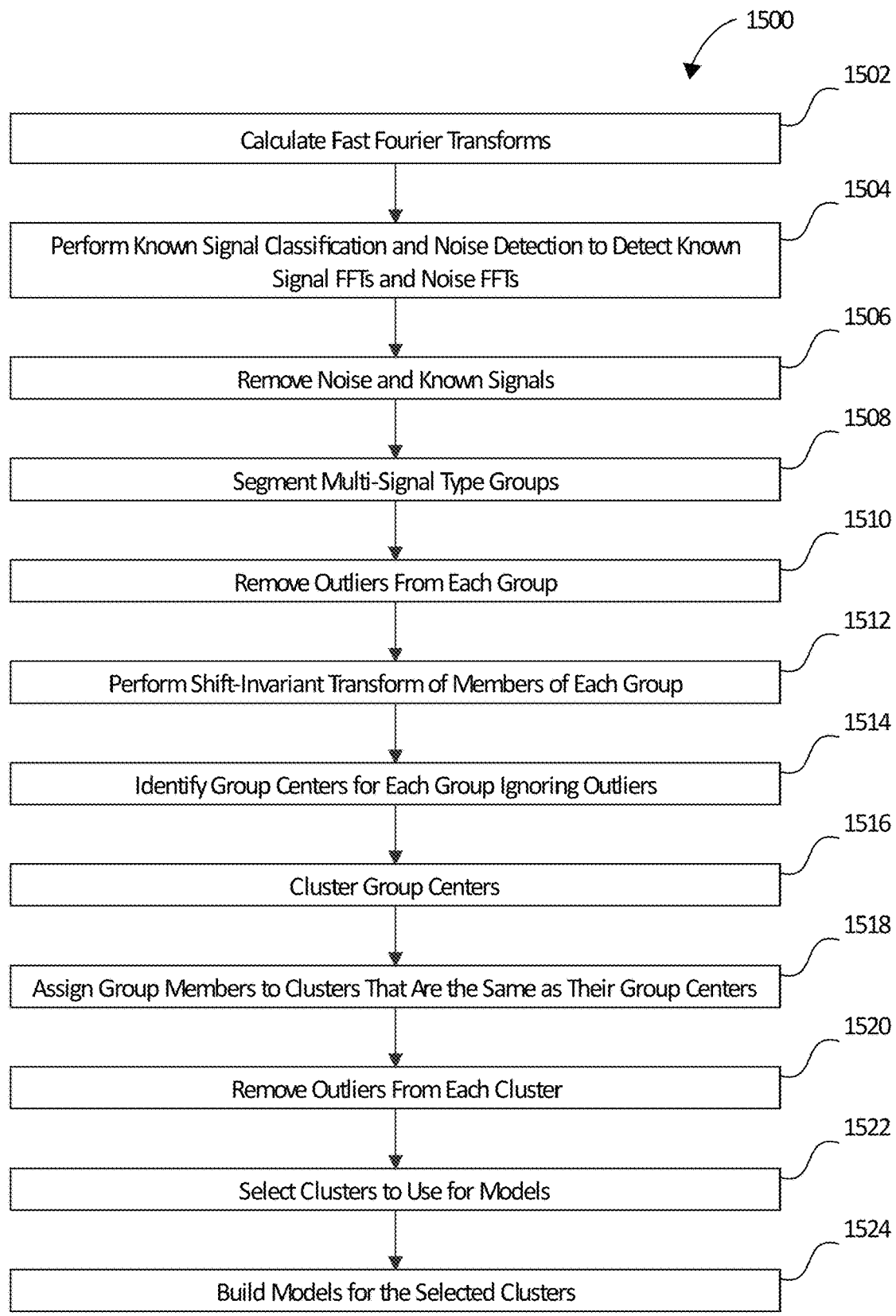
FIG. 15 illustrates an unknown signal characterization process in accordance with one or more embodiments.

FIG. 15 shows a flowchart of a process 1500 for performing unknown signal characterization, in accordance with disclosed embodiments. Generally, process 1500 exploits the fact that a single transmission will result in multiple continuous FFTs (e.g., one IEEE802.11g beacon corresponds to approximately 100 continuous 128-bin FFTs) and consecutive FFTs are most likely from the same clusters. So, process 1500 clusters only the group centers (i.e., mean value) and assigns labels to group members to be the same as the labels assigned to corresponding group centers. This approach thus greatly reduces the number of data points to work with.

For the embodiment shown in FIG. 15, the input to the process is a recording of IQ values over some period of time for identifying unknown signals present in that time frame. Operation 1502, operation 1504, and operation 1506 are performed to obtain frequency domain data and remove noise and known (if any) signal FFTs. In other embodiments where the input data is already in the frequency domain or does not include noise or known signal FFTs, process 1500 may begin at operation 1508.

Turning to process 1500, in operation 1502, FFTs are calculated for the IQ values and in operation 1504 known signal classification and noise detection as described herein are performed to identify known signal and noise FFTs. In operation 1506, FFTs for known signals and noise are removed using the results of operation 1504.

Before taking the group centers, two possibilities are considered—(I) all the FFTs in a group represent a single transmission, and (II) a group comprises of multiple transmissions of different types. So, in operation 1508, change point detection (CPD) is performed to detect changes in time series data. In one embodiment, a group of consecutive FFTs are input to a CPD process to determine if there is any change in the series of waveforms and find those change position if any. Based on the CPD results, the groups are divided into multiple subgroups. As a non-limiting example of a CPD process, Pruned Exact Linear Time (PELT) may be used.

In operation 1510, outliers are removed in a group to avoid a problem where the change points detected in operation 1506 do not exactly align with changes and introduced errors in a group. In one embodiment, group member $x_i$ is deemed an outlier if the distance between $x_i$ and $x_c$ (group center)$>=1.5$*standard deviation of the group. For the rest of process 1500 the outliers found in operation 1512 are ignored.

In operation 1512, shift-invariant transformation on the group members is performed to obtain a unique representation of the same signal class but shifted in frequency axis. In one embodiment, an m-SCF is computed as described herein. The group centers of the m-SCF of the group members are obtained and used in the clustering operations of process 1500.

In operation 1514, group centers are identified for each group, ignoring outliers, and in operation 1516, group centers are clustered. In one embodiment, a divisive hierarchical clustering method is used to perform clustering of operation 1512. Any suitable technique known to one of ordinary skill in the art to achieve divisive clustering may be used. In one embodiment, initially, all data points are deemed part of the same cluster. Then, the divisive-clustering process iteratively partitions the clusters until a pre-specified cluster number is achieved or some stopping criteria is met. In one embodiment, at each step, a current cluster is divided into two partitions using a based algorithm (e.g., k-means) with cluster number equal to 2. If the variances after such divisions is high relative to the variance of the original cluster, the current division is ignored and do not divide that cluster any further. In one embodiment, a variance ratio threshold may be used to compare variance of a current group to an original group.

In operation 1518, group members are assigned the same labels as the clustered group centers obtained in operation 1516.

In some cases, clustering results might not be completely accurate, so in operation 1520, outliers are detected in the clustered data (e.g., using the same approach as in operation 1508.

In operation 1522, clusters are selected to use as models for novelty detectors. In one embodiment, cluster selection includes ignoring a resultant cluster if the number of the cluster members is below some threshold. For our current work, we also ignore a cluster if the estimated bandwidths of most of the member signals corresponds to <=2 FFT bins since this means the cluster likely contains just spikes that result from IQ imbalance.

In operation 1524, novel signal detectors are trained based on the selected clusters, and added to the known signal classifiers and novelty detectors of FIG. 8 and FIG. 9. In one embodiment, clustered data is treated as labeled data based on the found cluster labels and novel signal detectors are trained using supervised learning techniques described herein. In one embodiment, training data is generated by selecting known signals with a close center bandwidth as the new signals and generate custom data by adding random noises to Gaussian pulse of width equal or close to the center bandwidth. This test data is then used for the model selection for the novel signal detectors of a current cluster. For model architecture, in one embodiment, autoencoder architectures may be used as described in this disclosure. In one embodiment, a binary cross-entropy may be used as the loss function for the unknown signals.

Some embodiments of the disclosure relate, generally, to a spectrum monitoring and analyzing system. The spectrum monitoring and analyzing system may be configured to classify surrounding wireless activities in real-time from streaming raw radio frequency (RF) measurements, and, in some cases, produce actionable results from the classification. In one embodiment, policies for tiered access of shared spectrum may be enforced based on signal classifications. In one embodiment, transmitters that intend to transmit a wireless signal using a spectrum may determine if a nearby, higher priority transmitter is using the spectrum.

Figure 16:
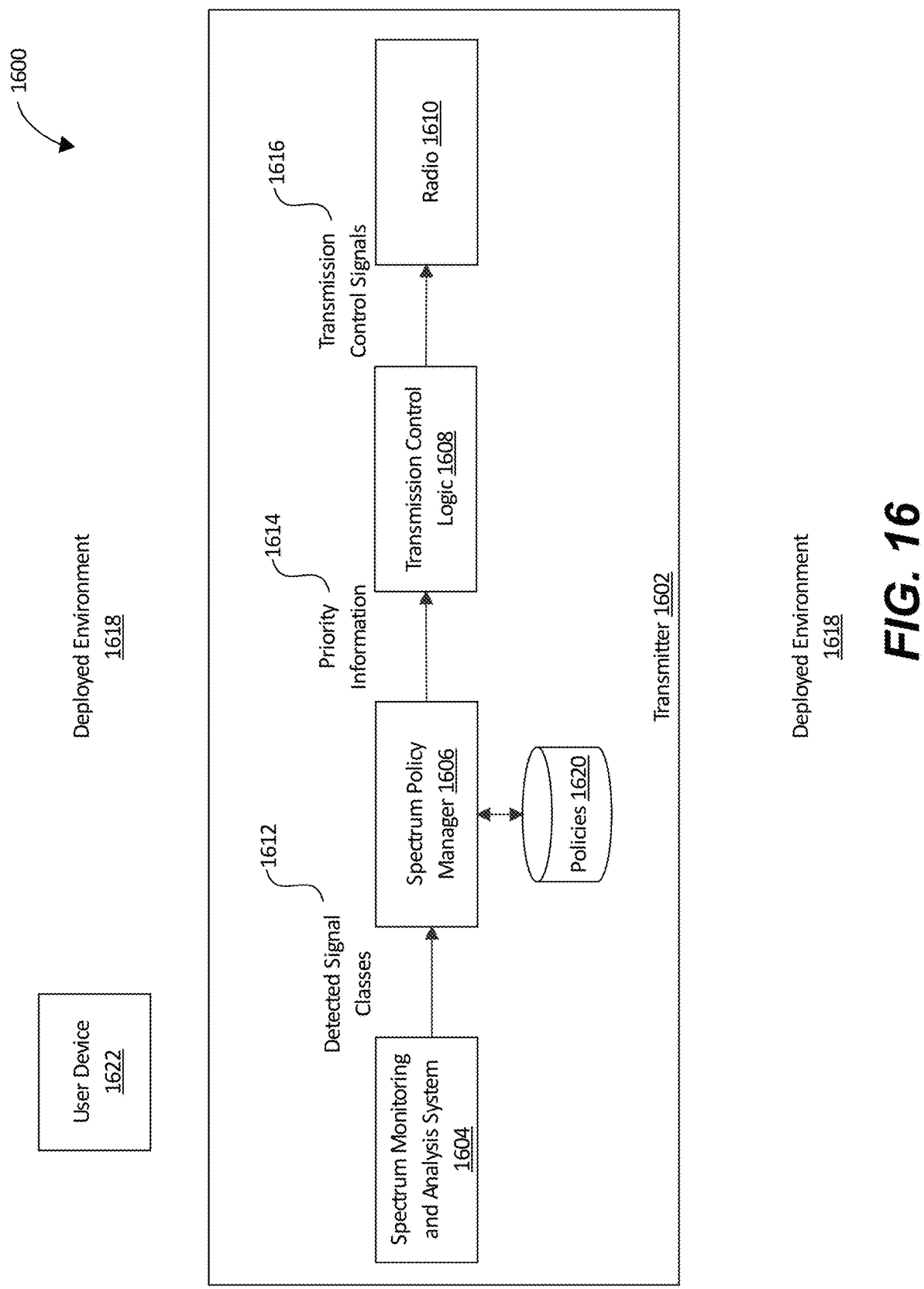
FIG. 16 illustrates a system for managing access to shared spectrum by transmitting devices in accordance with one or more embodiments.

FIG. 16 shows a functional block diagram of a system 1600 for managing access to shared spectrum by transmitting devices. In the embodiment shown in FIG. 16, transmitter 1602 is operating in deployed environment 1618, and access policies are in place for accessing shared spectrum in deployed environment 1618. At least one other transmitter is operational in deployed environment 1618, user device 1622 (user in this context meaning user of the shared spectrum).

Spectrum monitoring and analysis system 1604 is configured, generally, to sample wireless signals (i.e., gather RF measurements) present in deployed environment 1618 and classify the sampled wireless signals, as described in this disclosure. Spectrum monitoring and analysis system 1604 is configured to report detected signal classes 1612. In one embodiment, spectrum monitoring and analysis system 1604 is configured to report detected signal classes 1612 on a channel by channel basis. As a non-limiting example, spectrum monitoring and analysis system 1604 is configured to report detected signal classes 1612 grouped by channel. If there are channels for which spectrum monitoring and analysis system 1604 did not find a detected signal classes 1612, then spectrum monitoring and analysis system 1604 is configured to report that such channel is unused/available.

Spectrum policy manager 1606 is configured to manage policies 1620, analyze detected signal classes 1612 in view of policies 1620, and report priority information 1614 based on such analysis. Policies 1620 may be based, generally, on one or more shared access models for spectrum. In one embodiment, policies 1620 are based on a Spectrum Access System model which tiers access according to categories of users: incumbents (guaranteed to have highest priority and interference-free access of the band), priority access license users (prioritized access of the band when incumbents are absent), and generalized authorized access users (no guarantee of priority or interference-free access). As non-limiting examples, categories of user may be classes of organization, such as the military and emergency services, without limitation; users may also be protocols, such as ZIGBEE®, BLUETOOTH®, and Wi-Fi, without limitation; and users may be classes of devices that communicate wirelessly such as handsets, automobiles, and medical devices, without limitation.

Transmission control logic 1608 is configured to control operation of radio 1610 by sending transmission control signals 1616 in response to priority information 1614 received from spectrum policy manager 1606. In one embodiment, if spectrum policy manager 1606 reports that wireless signals associated with classes having higher priority access than transmitter 1602 were detected in deployed environment 1618, then transmission control logic 1608 is configured to restrict transmitting by radio 1610. As non-limiting examples, restricting transmission may include one or more of preventing radio 1610 from transmitting until a channel becomes available, assigning a channel to radio 1610 that is not being used by a higher priority user, changing the transmission scheme used by radio 1610 (e.g., use a version of spread spectrum that will not interfere with the signals, or use a different communication protocol), and changing signal characteristics to reduce interference with other signals.

In some embodiments, spectrum monitoring and analysis system 1604 may also incorporate performance monitoring and adjustment, as described in this disclosure. Notably, such embodiments of spectrum monitoring and analysis system 1604 may be included in a variety of devices without necessarily upgrading the hardware of those devices. More specifically, since performance monitoring and adjustment techniques described herein tune classification processes to available resources, spectrum monitoring and analysis system 1604 may be incorporated in a wide variety of devices. So, policy enforcement mechanisms for access of shared spectrum may be easily incorporated into existing device architectures as well as future device architectures.

In one embodiment, the classification node 100 of FIG. 1 may be a sub-system of a system that manages and assigns spectrum on a dynamic, as needed-basis and/or across tiers of access. A non-limiting example of larger system is a Spectrum Access System (SAS). More broadly, it should be appreciated that the classification node 100 may be integrated into commercial shared band applications such as 3.5 GHz Citizens Broadband Radio Service (CBRS).

One of ordinary skill in the art will recognize that the embodiments described herein offer many advantages. A particular advantage includes automated detection, classification, capture and protocol reverse engineering of signals, all automatically. Embodiments may be used to automatically analyze RF emanations (signals) and wireless protocols from unknown "black-box" devices and perform automated wireless protocol reverse engineering of such signals. Other advantages and benefits include an automated solution to: identify and study exposed surfaces of wireless systems, assess the robustness of wireless protocol implementations, reverse engineer wireless command and control protocols used by malicious actors (such as anticipating a botnet's repertoire of nefarious activity), create protocol specifications for wireless IDS/IPS/Firewall or penetration testing, monitor packets from live wireless connections or captured wireless network traffic that use a wide variety of protocols, perform smart fuzzing of unknown protocols using the discovered protocols vocabulary and grammar and determine the unknown protocols vulnerabilities, reverse engineer standard protocols so actual implementations may be compared to the standard specifications. Other advantages and applications exist.

Memories used to store signals or data as described herein may be arranged inside and outside a computer. For example, in a network, the system memory may include (or be part of) a distributed storage system that provides both storage and file-system, such as network-attached-storage (NAS), or a distributed storage system that provides only storage, such as a storage-area-network (SAN). In the case of NAS, it may include software capable of file management services, including, without limitation, FreeNAS™, NASLite™, and NexentaStor™. The NAS may contain one or more hard disks, arranged into logical, redundant storage containers or RAID arrays. The NAS may use one or more file-based protocols including, without limitation, Network File System (NFS), Windows NT™ File System (NTFS), File Allocation Table (FAT), Server Message Block/Common Internet File System (SMB/CIFS), or Apple Filling Protocol (AFP).

The information stored on a memory may be stored in a database. The particular architecture of the database may vary according to the specific type of data, mode of access of the data, or intended use of the data stored in the database; including, without limitation, a row-oriented data-store architecture, a column-based database management system, extensible-markup language, a knowledgebase, a frame database, or combinations thereof. A database management system (DBMS) may organize the storage of the data in the database, tailored for the specific requirements of the present system. The DBMS may use any number of query languages to access the database, including, without limitation, structured query language (SQL). In the case of SAN, embodiments of the invention may use any number of protocols to communicate between server and storage, including, without limitation, the SCSI protocol, HyperSCSCI protocol, iSCSI protocol, ATA over Ethernet, Fibre channel Protocol, and Fibre Channel over Ethernet.

Various embodiments of the disclosure described with reference to FIGS. 1 to 16, above, may be implemented to facilitate user interaction via a user interface, such as a graphical user interface, invocable by an application program. A user interface may be understood to mean any hardware, software, or combination of hardware and software that allows a user to interact with a computer system. For the purposes of this discussion, a user interface should be understood to include one or more user interface objects. User interface objects may include display regions, user activatable regions, and the like.

A user interface may include input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to a processing unit through a user input interface that is coupled to the system bus, but may be connected by other interface and bus structures, such as a parallel port, a virtual port, game port or a universal serial bus (USB) type interface.

A display region is a region of a user interface which displays information to the user. A user activatable region is a region of a user interface, such as a button or a menu, which allows the user to take some action with respect to the user interface.

A user interface may be invoked by an application program. When an application program invokes a user interface, it is typically for the purpose of interacting with a user. However, it is not necessary that an actual user ever interact with the user interface. It is also not necessary, for the purposes of this invention, that an interaction with the user interface be performed by an actual user. That is to say, it is foreseen that the user interface may have interaction with another program, such as a program created using macro programming language statements that simulate the actions of a user with respect to the user interface.

The graphical user interface may provide a user feedback. Based on the feedback, the user may select, input, and/or accept additional parameters (which includes user defined constraints) or to change parameter values. Parameters may also be added or changed automatically.

A user may enter commands and parameters at a computer terminal via a user interface, including a graphical user interface such as is described herein.

Embodiments described in this disclosure may be embodied wholly or partially in one or more computer program products supplied on any one of a variety of computer readable media. The computer program product(s) may be embodied in computer language statements of the types already described herein.

Various embodiments described herein may include elements described as implemented in a "computer" or a "computer system."

As mentioned herein, various embodiments of the disclosure may be described in terms of "algorithms," "module(s)," and "engine(s)," which may also refer to the logic, embodied in hardware and/or software, to accomplish the features, functions, tasks or steps described herein. In the case of a general purpose computer, the "modules" and "engines" may be embodied in software classes and applications executed by processor cores, and while the modules or engines are executing as instruction on a non-transitory storage medium a general purpose computer may be thought of as a special purpose computer or a specific purpose computer. The "modules," "engines," and "algorithms" may also relate to specific purpose hardware, including the firmware and machine code, controlling its operation.

Further, when embodied in software, the "modules" and "engines" that enable a computer system to act in accordance with the descriptions herein may be stored on non-transitory storage mediums in any number of language forms including, but not limited to, original source code, assembly code, object code, machine language, compressed or encrypted versions of the foregoing, and any and all equivalents. Some examples of languages that may be used to write the software include, but are not limited to, C, C++, JAVA, MATLAB, MINITAB, EXPRESS, DRAKON, DYNA, PYTHON, MOOSE, and RUBY. The software programs may be further translated into machine language or virtual machine instructions and stored in a program file in that form. The program file may then be stored on or in one or more of the articles of manufacture.

One of ordinary skill in the art will appreciate that "media," "medium," "computer-readable media," or "computer readable medium" as used here, may include a diskette, a magnetic tape, a digital tape, a compact disc, an integrated circuit, a ROM, a CD, DVD, Blu-Ray, a cartridge, flash memory, PROM, a RAM, a memory stick or card, or any other non-destructive storage medium useable by computers, including those that are re-writable.

Although the enabling software might be "written on" a disc, "embodied in" an integrated circuit, "carried over" a communications circuit, "stored in" a memory chip, or "loaded in" a cache memory, it will be appreciated that, for the purposes of this application, the software will be referred to simply as being "in" or "on" the computer readable medium. Thus, the terms "in" or "on" are intended to encompass the above mentioned and all equivalent and possible ways in which software can be associated with a computer readable medium.

For the sake of simplicity, therefore, the term "computer program product" is thus used to refer to a computer readable medium, as defined above, which has on it any form of software to enable a computer system to operate according to any embodiment of the invention. Software applications may include software for facilitating interaction with software modules, including user interface and application programming interfaces. Software may also be bundled, especially in a commercial context, to be built, compiled and/or installed on a local computer.

Although each operation illustrated by or in connection with figures and accompanying text recites acts performed in a particular order, embodiments of the present disclosure do not necessarily need to operate in that recited order. One of ordinary skill in the art would recognize many variations, including performing acts in parallel, or in a different order.

Certain embodiments of the present disclosure were described above. It is to be understood that the features of the various embodiments described herein were not mutually exclusive and can exist in various combinations and permutations, even if such combinations or permutations were not made express herein, without departing from the scope of the disclosure. In fact, variations, modifications, and other implementations of what was described herein will occur to those of ordinary skill in the art without departing from the scope of the disclosure. As such, the invention is not to be defined only by the preceding illustrative description, but only by the claims which follow, and legal equivalents thereof.

We claim:

1. A system, comprising:
   a radio; and
   a signal classifier, the signal classifier configured to detect and classify a signal of a wireless environment monitored by the radio, the signal classifier comprising:
      an energy-based classifier configured to analyze an entire set of measurements and generate a first signal classification result;
      a cyclostationary-based classifier configured to analyze a subset of the entire set of measurements and generate a second signal classification result; and
      a classification merger module configured to merge the first signal classification result and the second signal classification result.

2. The system of claim 1, wherein the cyclostationary-based classifier comprises:
   a data reducer configured to define a subset of the entire set of measurements responsive to a data reduction algorithm;

a data reducer configured to define a subset of the entire set of measurements responsive to a data reduction algorithm; and
   a feature calculator configured to identify cyclostationary features of measurements received from the data reducer.

3. The system of claim 1, wherein the signal classifier comprises a data store having stored thereon signal class models, and further wherein the signal class models are indicative of cyclostationary features of one or more predefined wireless signal protocols.

4. The system of claim 3 wherein at least one of the signal class models is a one-class support vector machine model.

5. The system of claim 1, wherein the signal classifier comprises a signal/noise classifier.

6. The system of claim 5, wherein the signal/noise classifier comprises a learned noise/signal classifier, wherein the learned noise/signal classifier was trained using supervised learning techniques to distinguish between noise and signals.

7. The system of claim 1, wherein the signal classifier comprises a known signal classifier, the known signal classifier configured to cluster signals of the wireless environment for a known signal class, wherein at least some of the clustered signals were present in parts of a frequency spectrum other than a first part of the frequency spectrum used to train a known signal classifier trained to classify the known signal class.

8. The system of claim 1, wherein the signal classifier is configured to receive radio-frequency measurements for the wireless environment at which the radio is deployed.

* * * * *